US012570368B2

(12) United States Patent
Blankespoor et al.

(10) Patent No.: US 12,570,368 B2
(45) Date of Patent: Mar. 10, 2026

(54) MITIGATING SENSOR NOISE IN LEGGED ROBOTS

(71) Applicant: Boston Dynamics, Inc., Waltham, MA (US)

(72) Inventors: Kevin Blankespoor, Arlington, MA (US); Marco da Silva, Waltham, MA (US)

(73) Assignee: Boston Dynamics, Inc., Waltham, MA (US)

( * ) Notice: Subject to any disclaimer, the term of this patent is extended or adjusted under 35 U.S.C. 154(b) by 134 days.

(21) Appl. No.: 18/457,996

(22) Filed: Aug. 29, 2023

(65) Prior Publication Data

US 2023/0406429 A1      Dec. 21, 2023

Related U.S. Application Data

(63) Continuation of application No. 17/409,922, filed on Aug. 24, 2021, now Pat. No. 11,780,515, which is a
(Continued)

(51) Int. Cl.
B62D 57/02        (2006.01)
B25J 9/16         (2006.01)
(Continued)

(52) U.S. Cl.
CPC ............ B62D 57/02 (2013.01); B25J 9/1633 (2013.01); B62D 57/032 (2013.01);
(Continued)

(58) Field of Classification Search
CPC ...... B62D 57/02; B62D 57/032; B25J 9/1633; G01L 5/0028; G05B 2219/41005;
(Continued)

(56) References Cited

U.S. PATENT DOCUMENTS 4,834,200 A      5/1989  Kajita
5,049,797 A  *   9/1991  Phillips ................. B25J 9/1635
                                                                    414/730
(Continued)

FOREIGN PATENT DOCUMENTS

KR         10-0815247 B1      3/2008

OTHER PUBLICATIONS

Abe et al., "Multiobjective Control with Frictional Contacts," Eurographics/ACM SIGGRAPH Symposium on Computer Animation, Aug. 4-5, 2007, San Diego, California, 10 pages. California, 10 pages.

(Continued)

*Primary Examiner* — Jason Holloway
(74) *Attorney, Agent, or Firm* — Knobbe, Martens, Olson & Bear, LLP

(57)                    ABSTRACT

An example implementation involves receiving measurements from an inertial sensor coupled to the robot and detecting an occurrence of a foot of the legged robot making contact with a surface. The implementation also involves reducing a gain value of an amplifier from a nominal value to a reduced value upon detecting the occurrence. The amplifier receives the measurements from the inertial sensor and provides a modulated output based on the gain value. The implementation further involves increasing the gain value from the reduced value to the nominal value over a predetermined duration of time after detecting the occurrence. The gain value is increased according to a profile indicative of a manner in which to increase the gain value of the predetermined duration of time. The implementation also involves controlling at least one actuator of the legged robot based on the modulated output during the predetermined duration of time.

22 Claims, 9 Drawing Sheets

400

Related U.S. Application Data continuation of application No. 16/783,261, filed on Feb. 6, 2020, now Pat. No. 11,124,252, which is a continuation of application No. 15/714,534, filed on Sep. 25, 2017, now Pat. No. 10,583,879, which is a continuation of application No. 15/077,870, filed on Mar. 22, 2016, now Pat. No. 9,789,919.

(51) Int. Cl.
  *B62D 57/032*     (2006.01)
  *G01L 5/00*     (2006.01)
(52) U.S. Cl.
  CPC .. *G01L 5/0028* (2013.01); *G05B 2219/41005* (2013.01); *G05B 2219/41006* (2013.01); *G05B 2219/41021* (2013.01); *G05B 2219/41025* (2013.01); *G05B 2219/41163* (2013.01); *Y10S 901/01* (2013.01)
(58) Field of Classification Search
  CPC ........... G05B 2219/41006; G05B 2219/41021; G05B 2219/41025; G05B 2219/41163; Y10S 901/01
  See application file for complete search history.

(56) References Cited

U.S. PATENT DOCUMENTS

| | | | |
|---|---|---|---|
| 5,151,859 A | 9/1992 | Yoshino et al. | |
| 5,355,064 A | 10/1994 | Yoshino et al. | |
| 5,416,393 A | 5/1995 | Gomi et al. | |
| 5,432,417 A | 7/1995 | Takenaka et al. | |
| 5,459,659 A | 10/1995 | Takenaka | |
| 5,644,204 A | 7/1997 | Nagle | |
| 5,737,217 A | 4/1998 | Nishikawa et al. | |
| 5,808,433 A | 9/1998 | Tagami et al. | |
| 5,838,130 A | 11/1998 | Ozawa | |
| 5,974,366 A | 10/1999 | Kawai et al. | |
| 6,064,167 A | 5/2000 | Takenaka et al. | |
| 6,374,157 B1 | 4/2002 | Takamura | |
| 6,484,068 B1 | 11/2002 | Yamamoto et al. | |
| 6,493,607 B1 | 12/2002 | Bourne et al. | |
| 6,802,382 B2 | 10/2004 | Hattori et al. | |
| 6,943,520 B2 | 9/2005 | Furuta et al. | |
| 6,992,455 B2 | 1/2006 | Kato et al. | |
| 6,992,457 B2 | 1/2006 | Furuta et al. | |
| 6,999,851 B2 | 2/2006 | Kato et al. | |
| 7,013,201 B2 | 3/2006 | Hattori et al. | |
| 7,076,331 B1 | 7/2006 | Nagatsuka et al. | |
| 7,120,518 B2 | 10/2006 | Takenaka et al. | |
| 7,131,315 B2 | 11/2006 | Rojo et al. | |
| 7,236,852 B2 | 6/2007 | Moridaira et al. | |
| 7,366,587 B2 | 4/2008 | Iribe et al. | |
| 7,386,364 B2 | 6/2008 | Mikami et al. | |
| 7,603,234 B2 | 10/2009 | Takenaka et al. | |
| 7,606,634 B2 | 10/2009 | Takenaka et al. | |
| 7,657,345 B2 | 2/2010 | Endo et al. | |
| 7,734,377 B2 | 6/2010 | Hasegawa | |
| 7,734,378 B2 | 6/2010 | Takenaka et al. | |
| 7,881,824 B2 | 2/2011 | Nagasaka et al. | |
| 7,949,430 B2 | 5/2011 | Pratt et al. | |
| 8,060,253 B2 | 11/2011 | Goswami et al. | |
| 8,108,070 B2 | 1/2012 | Tajima | |
| 8,172,013 B2 | 5/2012 | Shimada | |
| 8,195,332 B2 | 6/2012 | Pratt et al. | |
| 8,239,084 B2 | 8/2012 | Yamamoto et al. | |
| 8,306,657 B2 | 11/2012 | Yoshiike et al. | |
| 8,311,731 B2 | 11/2012 | Sugiura et al. | |
| 8,332,068 B2 | 12/2012 | Goswami et al. | |
| 8,386,076 B2 | 2/2013 | Honda et al. | |
| 8,396,593 B2 | 3/2013 | Orita | |
| 8,396,687 B2 | 3/2013 | Vock et al. | |
| 8,457,830 B2 | 6/2013 | Goulding | |
| 8,532,824 B2 | 9/2013 | Orita | |
| 8,565,921 B2 | 10/2013 | Doi | |
| 8,583,283 B2 | 11/2013 | Takenaka et al. | |
| 8,630,763 B2 | 1/2014 | Goulding | |
| 8,688,307 B2 | 4/2014 | Sekiya | |
| 8,738,178 B2 | 5/2014 | Choi et al. | |
| 8,825,391 B1 | 9/2014 | Urmson et al. | |
| 8,849,454 B2 | 9/2014 | Yun et al. | |
| 8,855,820 B2 | 10/2014 | Watabe | |
| 8,855,821 B2 | 10/2014 | Seo et al. | |
| 8,870,967 B2 | 10/2014 | Herr et al. | |
| 8,900,325 B2 | 12/2014 | Herr et al. | |
| 8,924,021 B2 | 12/2014 | Dariush et al. | |
| 8,948,956 B2 | 2/2015 | Takahashi et al. | |
| 8,958,915 B2 | 2/2015 | Takagi | |
| 8,965,573 B2 | 2/2015 | Maisonnier et al. | |
| 9,044,862 B2 | 6/2015 | Kim et al. | |
| 9,102,055 B1 | 8/2015 | Konolige et al. | |
| 9,207,678 B2 | 12/2015 | Kim | |
| 9,266,233 B2 | 2/2016 | Kornbluh et al. | |
| 9,317,743 B2 | 4/2016 | Datta et al. | |
| 9,352,470 B1 | 5/2016 | da Silva et al. | |
| 9,387,588 B1 | 7/2016 | Blankespoor et al. | |
| 9,387,896 B1 | 7/2016 | Blankespoor et al. | |
| 9,446,518 B1 | 9/2016 | Blankespoor | |
| 9,499,218 B1 | 11/2016 | Stephens | |
| 9,594,377 B1 | 3/2017 | Perkins et al. | |
| 10,246,151 B1 | 4/2019 | Stephens | |
| 11,780,515 B2 | 10/2023 | Blankespoor et al. | |
| 2002/0183897 A1 | 12/2002 | Kuroki et al. | |
| 2003/0009259 A1 | 1/2003 | Hattori et al. | |
| 2003/0154201 A1 | 8/2003 | Berestov | |
| 2004/0044440 A1 | 3/2004 | Takenaka | |
| 2004/0099450 A1 | 5/2004 | Kwok et al. | |
| 2004/0167641 A1 | 8/2004 | Kawai et al. | |
| 2004/0172165 A1 | 9/2004 | Iribe et al. | |
| 2004/0193323 A1 | 9/2004 | Higaki et al. | |
| 2004/0205417 A1 | 10/2004 | Moridaira et al. | |
| 2004/0230340 A1 | 11/2004 | Fukuchi et al. | |
| 2004/0236467 A1 | 11/2004 | Sano | |
| 2005/0021176 A1 | 1/2005 | Takenaka et al. | |
| 2005/0067993 A1 | 3/2005 | Kato et al. | |
| 2005/0075755 A1 | 4/2005 | Takenaka et al. | |
| 2005/0077856 A1 | 4/2005 | Takenaka et al. | |
| 2005/0110448 A1 | 5/2005 | Takenaka et al. | |
| 2005/0113973 A1 | 5/2005 | Endo et al. | |
| 2005/0119791 A1* | 6/2005 | Nagashima | B25J 9/161 |
| | | | 700/253 |
| 2005/0120820 A1 | 6/2005 | Takenaka et al. | |
| 2005/0216097 A1 | 9/2005 | Rifkin | |
| 2005/0228539 A1 | 10/2005 | Takenaka et al. | |
| 2005/0240307 A1 | 10/2005 | Kuroki et al. | |
| 2006/0064203 A1 | 3/2006 | Goto et al. | |
| 2006/0076167 A1 | 4/2006 | Setrakian et al. | |
| 2006/0173578 A1* | 8/2006 | Takenaka | B62D 57/032 |
| | | | 700/245 |
| 2006/0247799 A1 | 11/2006 | Takenaka et al. | |
| 2006/0247800 A1 | 11/2006 | Takenaka et al. | |
| 2007/0003915 A1 | 1/2007 | Templeman | |
| 2007/0126387 A1 | 6/2007 | Takenaka et al. | |
| 2007/0150095 A1 | 6/2007 | Zaier | |
| 2007/0152620 A1 | 7/2007 | Takenaka et al. | |
| 2007/0156283 A1 | 7/2007 | Takenaka | |
| 2007/0193789 A1 | 8/2007 | Takenaka et al. | |
| 2007/0220637 A1 | 9/2007 | Endo et al. | |
| 2007/0227786 A1 | 10/2007 | Hillis et al. | |
| 2007/0241713 A1 | 10/2007 | Yamamoto et al. | |
| 2008/0065269 A1 | 3/2008 | Hasegawa | |
| 2008/0133055 A1 | 6/2008 | Hasegawa | |
| 2008/0160873 A1 | 7/2008 | Yoneda | |
| 2008/0208391 A1 | 8/2008 | Hasegawa et al. | |
| 2009/0005906 A1 | 1/2009 | Tajima | |
| 2009/0030530 A1 | 1/2009 | Martin | |
| 2009/0171503 A1 | 7/2009 | Takenaka et al. | |
| 2009/0306821 A1 | 12/2009 | Park et al. | |
| 2009/0312867 A1 | 12/2009 | Hasegawa et al. | |
| 2009/0325699 A1 | 12/2009 | Delgiannidis | |
| 2010/0017028 A1 | 1/2010 | Suga et al. | |
| 2010/0057253 A1 | 3/2010 | Kwon et al. | |
| 2010/0113980 A1 | 5/2010 | Herr et al. | |

(56)                References Cited

U.S. PATENT DOCUMENTS

| 2010/0114329 A1 | 5/2010 | Casler et al. |
| 2010/0126785 A1 | 5/2010 | Shimada |
| 2010/0161120 A1 | 6/2010 | Goswami et al. |
| 2010/0161126 A1 | 6/2010 | Goswami et al. |
| 2010/0174409 A1 | 7/2010 | Park et al. |
| 2010/0252395 A1 | 10/2010 | Lehtonen et al. |
| 2010/0277483 A1 | 11/2010 | Lee et al. |
| 2010/0286822 A1* | 11/2010 | Zaier .................... B62D 57/032 |
| | | 700/245 |
| 2010/0292838 A1 | 11/2010 | Goswami et al. |
| 2011/0009241 A1 | 1/2011 | Lane et al. |
| 2011/0022232 A1 | 1/2011 | Yoshiike et al. |
| 2011/0098860 A1 | 4/2011 | Yoshiike et al. |
| 2011/0172825 A1 | 7/2011 | Lee et al. |
| 2011/0178637 A1 | 7/2011 | Lee et al. |
| 2011/0224827 A1 | 9/2011 | Andoh |
| 2011/0231050 A1 | 9/2011 | Goulding |
| 2011/0257764 A1 | 10/2011 | Herr et al. |
| 2011/0264264 A1 | 10/2011 | Shirokura et al. |
| 2011/0301756 A1 | 12/2011 | Yoshiike et al. |
| 2012/0072026 A1 | 3/2012 | Takagi |
| 2012/0158175 A1 | 6/2012 | Lee et al. |
| 2012/0203359 A1 | 8/2012 | Schimmels et al. |
| 2012/0245734 A1 | 9/2012 | Yun et al. |
| 2012/0259463 A1 | 10/2012 | Orita |
| 2012/0277907 A1 | 11/2012 | Kim et al. |
| 2012/0310412 A1 | 12/2012 | Seo et al. |
| 2012/0316662 A1 | 12/2012 | Huh et al. |
| 2012/0316683 A1 | 12/2012 | Seo et al. |
| 2012/0316684 A1 | 12/2012 | Lee et al. |
| 2013/0079929 A1 | 3/2013 | Lim et al. |
| 2013/0144439 A1 | 6/2013 | Lee et al. |
| 2013/0178983 A1 | 7/2013 | Watabe |
| 2013/0184861 A1 | 7/2013 | Pratt et al. |
| 2013/0206488 A1 | 8/2013 | Horinouchi |
| 2013/0238122 A1 | 9/2013 | Hodgins et al. |
| 2013/0238183 A1 | 9/2013 | Goulding |
| 2014/0019082 A1 | 1/2014 | Lan et al. |
| 2015/0051734 A1 | 2/2015 | Zheng et al. |
| 2015/0073592 A1 | 3/2015 | Kaneko et al. |
| 2015/0114149 A1* | 4/2015 | Gomi .................... B25J 9/1635 |
| | | 901/19 |
| 2015/0120044 A1 | 4/2015 | Cory |
| 2015/0127118 A1 | 5/2015 | Herr et al. |
| 2015/0134080 A1 | 5/2015 | Roh |
| 2015/0202768 A1 | 7/2015 | Moridaira |
| 2017/0255301 A1* | 9/2017 | Norton .................... G06F 3/011 |

OTHER PUBLICATIONS

Hash Lamon et al., "Simple Virtual Slip Force Sensor for Walking Biped Robots," IEEE, 2013, pp. 1-5.
Kim et al., "Landing Force Controller for a Humanoid Robot: Time-Domain Passivity Approach," 2006 IEEE Conference on Systems, Man, and Cybernetics, Oct. 8-11, 2006, Taipei, Taiwan, pp. 4237-4242.
Silva et al., "Goal-Oriented Biped Walking Based on Force Inter-action Control," Proceedings of the 2001 IEEE International Conference on Robotics & Automation, Seoul, Korea, May 21-26, 2001, pp. 4122-3127.
Silva et al., "Towards Force Interaction Control of Biped Walking Robots," Proceedings of 2004 IEEE/RSJ International Conference on Intelligent Robots and Systems, Sendai, Japan, Sep. 28-Oct. 2, 2004, pp. 2568-2573.
G0rsic et al., "Online Phase Detection Using Wearable Sensors for Walking with a Robotic Prosthesis," Sensors, 2014, pp. 2776-2794, vol. 14.
Bajracharya, et al., "High fidelity day/night stereo mapping with vegetation and negative obstacledetection for Vision-in-the-loop walking," 2013 IEEE/RSJ International Conference on Intelligent Robots and Systems (IROS), Nov. 2013, pp. 3663-3670, IEEE, Tokyo, Japan.
Doshi et al., "Collision Detection in Legged Locomotion using Supervised Learning", 2007, 6 pages, MIT Cambridge, us.
Prati et al., "Capture Point: A Step Toward Humanoid Push Recovery" Symposium, Dec. 2-6, 2006, pp. 1-8, Genoa, Italy.
Koolen et al., "Caturability-based Analysis and Control of Legged Locomotion, Part 1: Theory and Application to Three Simple Gait Models," Nov. 2011, pp. 1-28.
Pratt et al., "Capturability-Based Analysis and Control of Legged Locomotion, Part 2: Application to M2V2, a Lower body Humanoid," Apr. 2011, pp. 1-25.

* cited by examiner

700

750

800

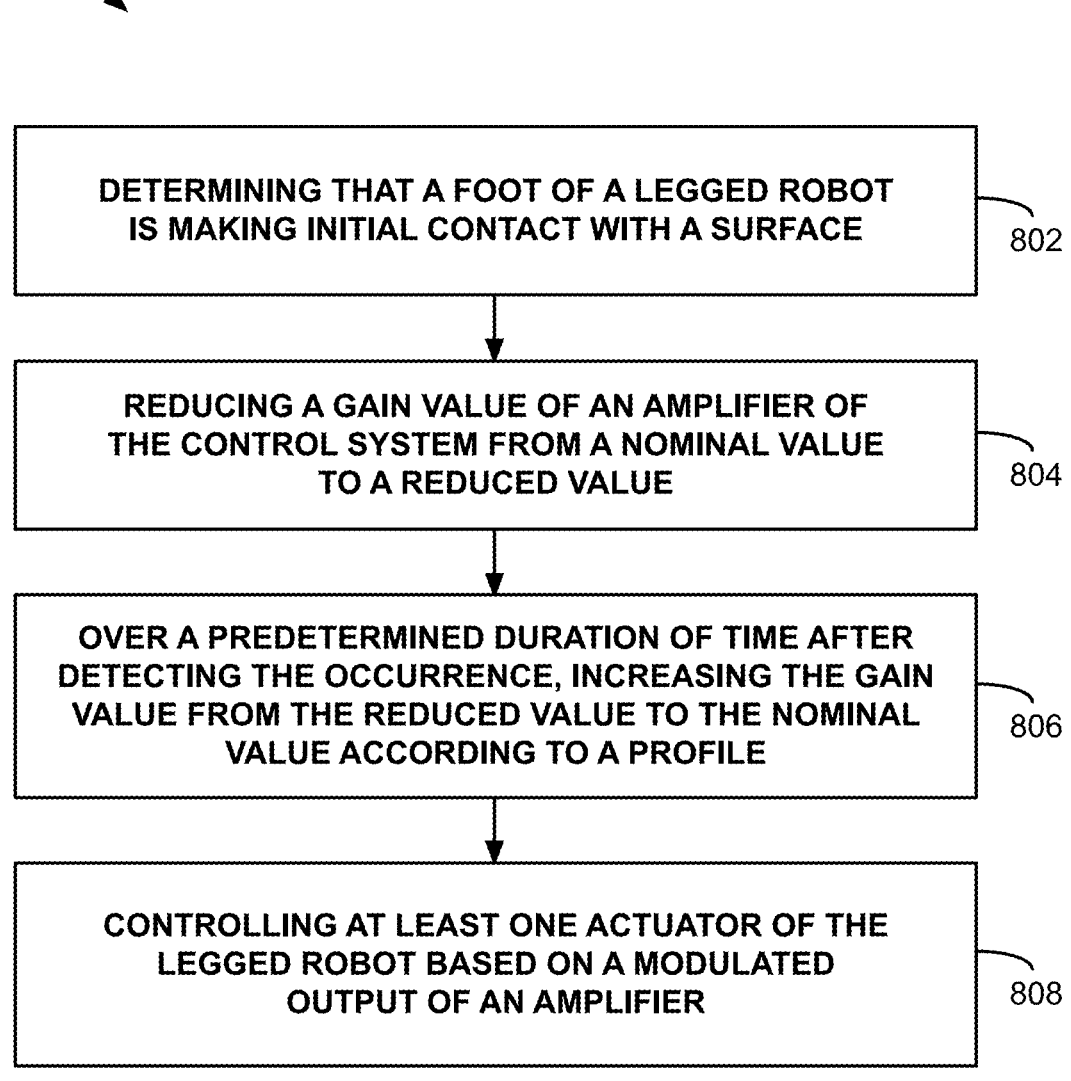

DETERMINING THAT A FOOT OF A LEGGED ROBOT IS MAKING INITIAL CONTACT WITH A SURFACE      802

REDUCING A GAIN VALUE OF AN AMPLIFIER OF THE CONTROL SYSTEM FROM A NOMINAL VALUE TO A REDUCED VALUE      804

OVER A PREDETERMINED DURATION OF TIME AFTER DETECTING THE OCCURRENCE, INCREASING THE GAIN VALUE FROM THE REDUCED VALUE TO THE NOMINAL VALUE ACCORDING TO A PROFILE      806

CONTROLLING AT LEAST ONE ACTUATOR OF THE LEGGED ROBOT BASED ON A MODULATED OUTPUT OF AN AMPLIFIER      808

Figure 8

MITIGATING SENSOR NOISE IN LEGGED ROBOTS

CROSS REFERENCE TO RELATED APPLICATIONS

This application is a continuation of U.S. patent application Ser. No. 17/409,922, filed on Aug. 24, 2021 which is a continuation of, and claims priority under 35 U.S.C. § 120 from, U.S. patent application Ser. No. 16/783,261, filed on Feb. 6, 2020, which is a continuation of U.S. patent application Ser. No. 15/714,534, filed on Sep. 25, 2017, which is a continuation of U.S. patent application Ser. No. 15/077,870, filed on Mar. 22, 2016. The disclosures of these prior applications are considered part of the disclosure of this application and are hereby incorporated by reference in their entireties.

BACKGROUND

As technology advances, various types of robotic devices are being created for performing a variety of functions that may assist users. Robotic devices may be used for applications involving material handling, transportation, welding, assembly, and dispensing, among others. Over time, the manner in which these robotic systems operate is becoming more intelligent, efficient, and intuitive. As robotic systems become increasingly prevalent in numerous aspects of modern life, it is desirable for robotic systems to be efficient. Therefore, a demand for efficient robotic systems has helped open up a field of innovation in actuators, movement, sensing techniques, as well as component design and assembly.

SUMMARY

The present application discloses implementations that relate to mitigating spurious measurements of a sensor coupled to a robotic device. One example involves detecting, by a control system of a legged robot, an occurrence of a foot of the legged robot making contact with a surface. The control system is configured to receive, as a control input, measurements from an inertial sensor coupled to the legged robot. A given measurement includes a vibration component representative of vibrations caused by the foot of the legged robot making contact with the surface. The example also involves reducing a gain value of an amplifier of the control system from a nominal value to a reduced value upon detecting the occurrence. The amplifier receives the measurements from the inertial sensor and provides a modulated output based on the gain value. The example further involves increasing the gain value from the reduced value to the nominal value over a predetermined duration of time after detecting the occurrence. The gain value is increased according to a profile indicative of a manner in which to increase the gain value over the predetermined duration of time. Additionally, the example involves controlling at least one actuator of the legged robot based on the modulated output during the predetermined duration of time.

Another example describes a non-transitory computer-readable medium having instructions stored thereon that, upon execution by at least one processor, causes a control system of a legged robot to perform a set of operations. The operations include detecting, by the control system of a legged robot, an occurrence of a foot of the legged robot making contact with a surface. The control system is configured to receive, as a control input, measurements from an inertial sensor coupled to the legged robot. A given measurement includes a vibration component representative of vibrations caused by the foot of the legged robot making contact with the surface. The operations also include reducing a gain value of an amplifier of the control system from a nominal value to a reduced value upon detecting the occurrence. The amplifier receives the measurements from the inertial sensor and provides a modulated output based on the gain value. The operations further include increasing the gain value from the reduced value to the nominal value over a predetermined duration of time after detecting the occurrence. The gain value is increased according to a profile indicative of a manner in which to increase the gain value over the predetermined duration of time. Additionally, the operations include controlling at least one actuator of the legged robot based on the modulated output during the predetermined duration of time.

In still another example, the present application describes a robot. The robot includes at least one robotic leg, an inertial sensor, and a control system. The at least one robotic leg includes a foot. The inertial sensor is coupled to a portion of the legged robot. The control system is configured to perform a set of operations. The operations include receiving, as a control input, measurements from the inertial sensor. A given measurement includes a vibration component representative of vibrations caused by the foot making contact with the surface. The operations also include detecting an occurrence of a foot of the legged robot making contact with a surface. The operations further include reducing a gain value of an amplifier of the control system from a nominal value to a reduced value upon detecting the occurrence. The amplifier receives the measurements from the inertial sensor and provides a modulated output based on the gain value. Additionally, the operations include increasing the gain value from the reduced value to the nominal value over a predetermined duration of time after detecting the occurrence. The gain value is increased according to a profile indicative of a manner in which to increase the gain value of the predetermined duration of time. Additionally, the operations include controlling at least one actuator of the legged robot based on the modulated output during the predetermined duration of time.

In yet another example, the present application describes a system. The system includes a means for detecting, by a controller of a legged robot, an occurrence of a foot of the legged robot making contact with a surface. The controller is configured to receive, as a control input, measurements from an inertial sensor coupled to the legged robot. A given measurement includes a vibration component representative of vibrations caused by the foot of the legged robot making contact with the surface. The system also includes a means for reducing a gain value of an amplifier of the controller from a nominal value to a reduced value upon detecting the occurrence. The amplifier receives the measurements from the inertial sensor and provides a modulated output based on the gain value. The system further includes a means for increasing the gain value from the reduced value to the nominal value over a predetermined duration of time after detecting the occurrence. The gain value is increased according to a profile indicative of a manner in which to increase the gain value over the predetermined duration of time. Additionally, the system includes a means for controlling at least one actuator of the legged robot based on the modulated output during the predetermined duration of time.

The foregoing summary is illustrative only and is not intended to be in any way limiting. In addition to the illustrative aspects, implementations, and features described above, further aspects, implementations, and features will become apparent by reference to the figures and the following detailed description and the accompanying drawings.

DESCRIPTION OF DRAWINGS

FIG. 8 is a flowchart, according to an example implementation.

DETAILED DESCRIPTION

Figure 1:
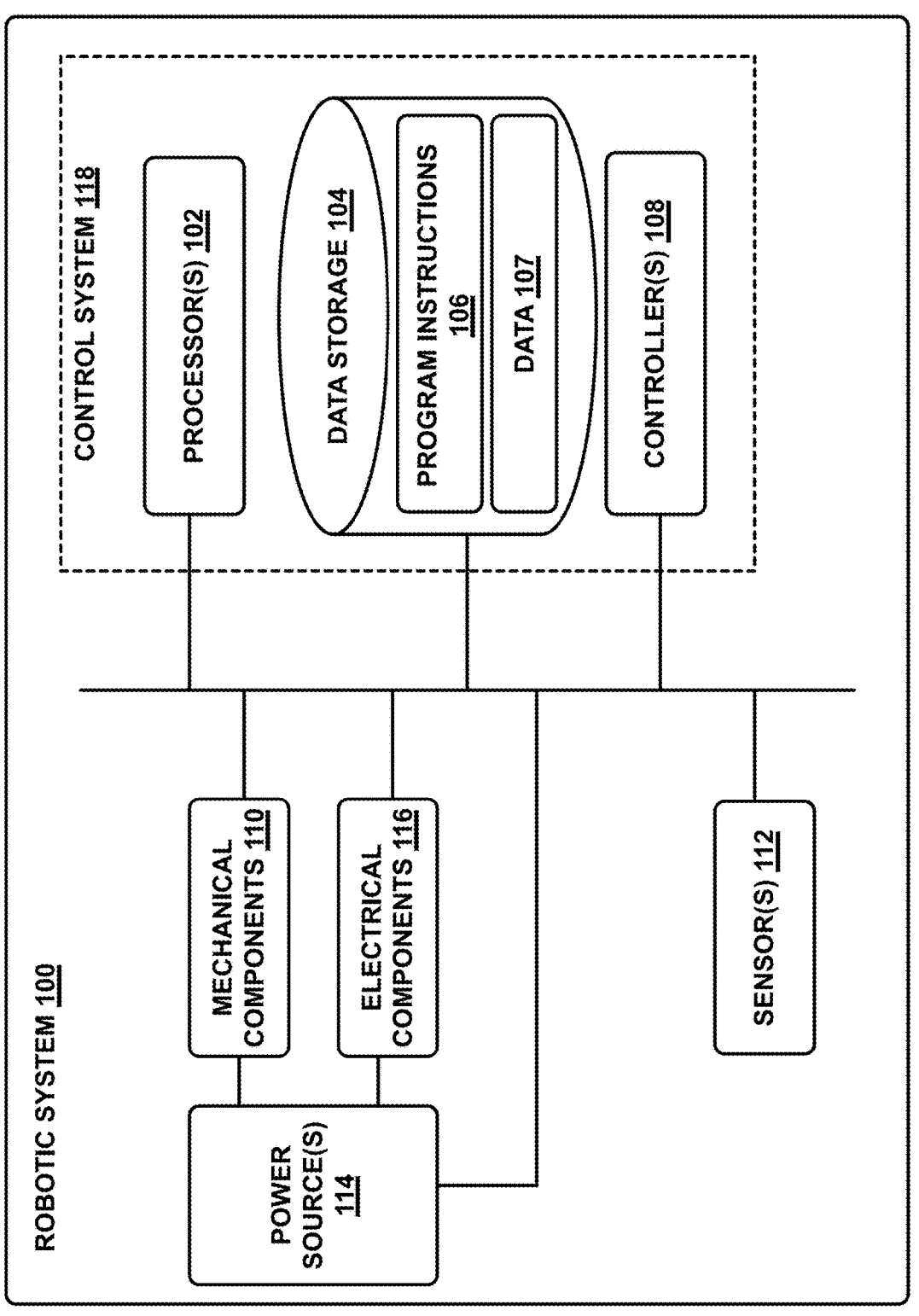
FIG. 1 illustrates a configuration of a robotic system, according to an example implementation.

The following detailed description describes various features and operations of the disclosed systems and methods with reference to the accompanying figures. The illustrative system and method implementations described herein are not meant to be limiting. It may be readily understood that certain aspects of the disclosed systems and methods can be arranged and combined in a wide variety of different configurations, all of which are contemplated herein.
Overview:

Locomotion systems allow robots and robotic devices to transport themselves around an environment. Various kinds of locomotion may be employed, depending upon the particular robot. Some robots may have motorized wheels, which provide a relatively consistent and smooth motion. However, other types of locomotion may produce comparatively rougher motion that can agitate components on the robot. For instance, a legged robot may move in accordance with a particular gait (e.g., walking, trotting, running, etc.) which involves stepping onto solid surfaces. A step may involve a foot making abrupt contact with the ground, producing vibrations and other disturbances at that foot, which can propagate through the leg to the robot's body. Such disturbances may produce transient noise, which may be captured as spurious measurements by inertial sensors coupled to the robot.

Control systems of a legged robot may use sensor measurements as a basis for controlling actuators and other components of the robot in order to effect balancing and/or locomotion. Some control systems (e.g., constant-gain proportional-derivative (PD) controllers and/or proportional-integral-derivative (PID) controllers, among other possible control schemes) may include feedback loops that rely on sensor measurements as inputs. Such feedback loops generally serve to minimize an error value between a measurement and a desired set point. When the input measurement includes noise or other spurious signals, the control system may react by unnecessarily correcting for those fluctuations in the measurement. In some cases, amplification of the spurious vibration signals may produce instability in the control system.

As one example, an inertial measurement unit (IMU) coupled to a foot of the legged robot may measure vibrations produced when that foot steps onto a surface. As the legged robot walks along, these vibrations may be picked up by the IMU and be supplied to a control system. Certain control schemes, such as PD controllers, may amplify or otherwise be affected by such vibrations and/or other spurious artifacts.

Implementations of the present disclosure may involve modifying a feedback gain value of a control system in order to reduce the effects of vibrations or other spurious signals on the control system's performance. When a robot's foot steps onto the ground, the gain value may be reduced. Over time, as the foot vibrations attenuate and dampen over time, the gain value (or values) of the control system may be increased until it reaches a nominal gain value. Reducing the gain value during this period of foot vibrations reduces the impact that those vibrations would otherwise have on the control system.

An example operation may involve setting a feedback gain value to a reduced value at or near the time at which a foot makes contact with a surface, then increasing that gain value over time as the vibrations attenuate. The duration of this time-based gain modification may depend on the robot, the surface upon which it steps, and/or the robot's gait, among other possible factors. Additionally, the manner in which the gain value changes over time may also vary depending upon the particular implementation. This operation may be repeated for each step that the robot takes. As a result, a control system that employs this gain value modification technique may be designed to have a higher nominal gain value compared to a typical constant-gain control system.

The manner in which the gain value is modified over time (e.g., lowered to a reduced value, then increased over time to a nominal value) may depend upon the nature of the vibrations and spurious signals captured by a particular sensor. As one example, the gain value may be reduced to zero or another small value, then increased linearly over some period of time until it reaches the nominal gain value. As another example, the gain value may increase at an exponential rate. In other cases, gain could be increasing according to a function that increases gain from the reduced value to the nominal value. The gain value at a particular time may be determined based on the stance duration of the legged robot, the duration of the vibrations produced by the robot's leg when it steps onto the ground (or other surface), and the desired rate of increase for the gain value, among other possible factors.

In some instances, data from a robot's sensors may be collected and analyzed in order to determine an effective way to vary the gain value in order to achieve a desired result. Information such as the duration and amplitude of foot vibrations, the rate of decay of those vibrations, and other characteristics of the vibrations may be determined from such data. Accurate characterizations of such vibrations may increase the robustness of a control system. A number of these characterizations may be made for different robotic gaits, different environments and/or surface types, and different robot configurations.
Example Robotic Systems FIG. 1 illustrates an example configuration of a robotic system that may be used in connection with the implementations described herein. The robotic system 100 may be configured to operate autonomously, semi-autonomously, and/or using directions provided by user(s). The robotic system 100 may be implemented in various forms, such as a biped robot, quadruped robot, or some other arrangement. Furthermore, the robotic system 100 may also be referred to as a robot, robotic device, or mobile robot, among other designations.

As shown in FIG. 1, the robotic system 100 may include processor(s) 102, data storage 104, and controller(s) 108, which together may be part of a control system 118. The robotic system 100 may also include sensor(s) 112, power source(s) 114, mechanical components 110, and electrical components 116. Nonetheless, the robotic system 100 is shown for illustrative purposes, and may include more or fewer components. The various components of robotic system 100 may be connected in any manner, including wired or wireless connections. Further, in some examples, components of the robotic system 100 may be distributed among multiple physical entities rather than a single physical entity. Other example illustrations of robotic system 100 may exist as well.

Processor(s) 102 may operate as one or more general-purpose hardware processors or special purpose hardware processors (e.g., digital signal processors, application specific integrated circuits, etc.). The processor(s) 102 may be configured to execute computer-readable program instructions 106, and manipulate data 107, both of which are stored in the data storage 104. The processor(s) 102 may also directly or indirectly interact with other components of the robotic system 100, such as sensor(s) 112, power source(s) 114, mechanical components 110, and/or electrical components 116.

The data storage 104 may be one or more types of hardware memory. For example, the data storage 104 may include or take the form of one or more computer-readable storage media that can be read or accessed by processor(s) 102. The one or more computer-readable storage media can include volatile and/or non-volatile storage components, such as optical, magnetic, organic, or another type of memory or storage, which can be integrated in whole or in part with processor(s) 102. In some implementations, the data storage 104 can be a single physical device. In other implementations, the data storage 104 can be implemented using two or more physical devices, which may communicate with one another via wired or wireless communication. As noted previously, the data storage 104 may include the computer-readable program instructions 106 and the data 107. The data 107 may be any type of data, such as configuration data, sensor data, and/or diagnostic data, among other possibilities.

The controller 108 may include one or more electrical circuits, units of digital logic, computer chips, and/or microprocessors that are configured to (perhaps among other tasks), interface between any combination of the mechanical components 110, the sensor(s) 112, the power source(s) 114, the electrical components 116, the control system 118, and/or a user of the robotic system 100. In some implementations, the controller 108 may be a purpose-built embedded device for performing specific operations with one or more subsystems of the robotic device 100.

The control system 118 may monitor and physically change the operating conditions of the robotic system 100. In doing so, the control system 118 may serve as a link between portions of the robotic system 100, such as between mechanical components 110 and/or electrical components 116. In some instances, the control system 118 may serve as an interface between the robotic system 100 and another computing device. Further, the control system 118 may serve as an interface between the robotic system 100 and a user. The instance, the control system 118 may include various components for communicating with the robotic system 100, including a joystick, buttons, and/or ports, etc. The example interfaces and communications noted above may be implemented via a wired or wireless connection, or both. The control system 118 may perform other operations for the robotic system 100 as well.

During operation, the control system 118 may communicate with other systems of the robotic system 100 via wired or wireless connections, and may further be configured to communicate with one or more users of the robot. As one possible illustration, the control system 118 may receive an input (e.g., from a user or from another robot) indicating an instruction to perform a particular gait in a particular direction, and at a particular speed. A gait is a pattern of movement of the limbs of an animal, robot, or other mechanical structure.

Based on this input, the control system 118 may perform operations to cause the robotic device 100 to move according to the requested gait. As another illustration, a control system may receive an input indicating an instruction to move to a particular geographical location. In response, the control system 118 (perhaps with the assistance of other components or systems) may determine a direction, speed, and/or gait based on the environment through which the robotic system 100 is moving en route to the geographical location.

Operations of the control system 118 may be carried out by the processor(s) 102. Alternatively, these operations may be carried out by the controller 108, or a combination of the processor(s) 102 and the controller 108. In some implementations, the control system 118 may partially or wholly reside on a device other than the robotic system 100, and therefore may at least in part control the robotic system 100 remotely.

Mechanical components 110 represent hardware of the robotic system 100 that may enable the robotic system 100 to perform physical operations. As a few examples, the robotic system 100 may include physical members such as leg(s), arm(s), and/or wheel(s). The physical members or other parts of robotic system 100 may further include actuators arranged to move the physical members in relation to one another. The robotic system 100 may also include one or more structured bodies for housing the control system 118 and/or other components, and may further include other types of mechanical components. The particular mechanical components 110 used in a given robot may vary based on the design of the robot, and may also be based on the operations and/or tasks the robot may be configured to perform.

In some examples, the mechanical components 110 may include one or more removable components. The robotic system 100 may be configured to add and/or remove such removable components, which may involve assistance from a user and/or another robot. For example, the robotic system 100 may be configured with removable arms, hands, feet, and/or legs, so that these appendages can be replaced or changed as needed or desired. In some implementations, the robotic system 100 may include one or more removable and/or replaceable battery units or sensors. Other types of removable components may be included within some implementations.

The robotic system 100 may include sensor(s) 112 arranged to sense aspects of the robotic system 100. The sensor(s) 112 may include one or more force sensors, torque sensors, velocity sensors, acceleration sensors, position sensors, proximity sensors, motion sensors, location sensors, load sensors, temperature sensors, touch sensors, depth sensors, ultrasonic range sensors, infrared sensors, object sensors, and/or cameras, among other possibilities. Within some examples, the robotic system 100 may be configured to receive sensor data from sensors that are physically separated from the robot (e.g., sensors that are positioned on other robots or located within the environment in which the robot is operating).

The sensor(s) 112 may provide sensor data to the processor(s) 102 (perhaps by way of data 107) to allow for interaction of the robotic system 100 with its environment, as well as monitoring of the operation of the robotic system 100. The sensor data may be used in evaluation of various factors for activation, movement, and deactivation of mechanical components 110 and electrical components 116 by control system 118. For example, the sensor(s) 112 may capture data corresponding to the terrain of the environment or location of nearby objects, which may assist with environment recognition and navigation. In an example configuration, sensor(s) 112 may include RADAR (e.g., for long-range object detection, distance determination, and/or speed determination), LIDAR (e.g., for short-range object detection, distance determination, and/or speed determination), SONAR (e.g., for underwater object detection, distance determination, and/or speed determination), VICON® (e.g., for motion capture), one or more cameras (e.g., stereoscopic cameras for 3D vision), a global positioning system (GPS) transceiver, and/or other sensors for capturing information of the environment in which the robotic system 100 is operating. The sensor(s) 112 may monitor the environment in real time, and detect obstacles, elements of the terrain, weather conditions, temperature, and/or other aspects of the environment.

Further, the robotic system 100 may include sensor(s) 112 configured to receive information indicative of the state of the robotic system 100, including sensor(s) 112 that may monitor the state of the various components of the robotic system 100. The sensor(s) 112 may measure activity of systems of the robotic system 100 and receive information based on the operation of the various features of the robotic system 100, such the operation of extendable legs, arms, or other mechanical and/or electrical features of the robotic system 100. The data provided by the sensor(s) 112 may enable the control system 118 to determine errors in operation as well as monitor overall operation of components of the robotic system 100.

As an example, the robotic system 100 may use force sensors to measure load on various components of the robotic system 100. In some implementations, the robotic system 100 may include one or more force sensors on an arm or a leg to measure the load on the actuators that move one or more members of the arm or leg. As another example, the robotic system 100 may use one or more position sensors to sense the position of the actuators of the robotic system. For instance, such position sensors may sense states of extension, retraction, or rotation of the actuators on arms or legs.

As another example, the sensor(s) 112 may include one or more velocity and/or acceleration sensors. For instance, the sensor(s) 112 may include an inertial measurement unit (IMU). The IMU may sense velocity and acceleration in the world frame, with respect to the gravity vector. The velocity and acceleration sensed by the IMU may then be translated to that of the robotic system 100 based on the location of the IMU in the robotic system 100 and the kinematics of the robotic system 100.

The robotic system 100 may include other types of sensors not explicated discussed herein. Additionally or alternatively, the robotic system may use particular sensors for purposes not enumerated herein.

The robotic system 100 may also include one or more power source(s) 114 configured to supply power to various components of the robotic system 100. Among other possible power systems, the robotic system 100 may include a hydraulic system, electrical system, batteries, and/or other types of power systems. As an example illustration, the robotic system 100 may include one or more batteries configured to provide charge to components of the robotic system 100. Some of the mechanical components 110 and/or electrical components 116 may each connect to a different power source, may be powered by the same power source, or be powered by multiple power sources.

Any type of power source may be used to power the robotic system 100, such as electrical power or a gasoline engine. Additionally or alternatively, the robotic system 100 may include a hydraulic system configured to provide power to the mechanical components 110 using fluid power. Components of the robotic system 100 may operate based on hydraulic fluid being transmitted throughout the hydraulic system to various hydraulic motors and hydraulic cylinders, for example. The hydraulic system may transfer hydraulic power by way of pressurized hydraulic fluid through tubes, flexible hoses, or other links between components of the robotic system 100. The power source(s) 114 may charge using various types of charging, such as wired connections to an outside power source, wireless charging, combustion, or other examples.

The electrical components 116 may include various mechanisms capable of processing, transferring, and/or providing electrical charge or electric signals. Among possible examples, the electrical components 116 may include electrical wires, circuitry, and/or wireless communication transmitters and receivers to enable operations of the robotic system 100. The electrical components 116 may interwork with the mechanical components 110 to enable the robotic system 100 to perform various operations. The electrical components 116 may be configured to provide power from the power source(s) 114 to the various mechanical components 110, for example. Further, the robotic system 100 may include electric motors. Other examples of electrical components 116 may exist as well.

Although not shown in FIG. 1, the robotic system 100 may include a body, which may connect to or house appendages and components of the robotic system. As such, the structure of the body may vary within examples and may further depend on particular operations that a given robot may have been designed to perform. For example, a robot developed to carry heavy loads may have a wide body that enables placement of the load. Similarly, a robot designed to reach high speeds may have a narrow, small body that does not have substantial weight. Further, the body and/or the other components may be developed using various types of materials, such as metals or plastics. Within other examples, a robot may have a body with a different structure or made of various types of materials.

The body and/or the other components may include or carry the sensor(s) 112. These sensors may be positioned in various locations on the robotic device 100, such as on the body and/or on one or more of the appendages, among other examples.

On its body, the robotic device 100 may carry a load, such as a type of cargo that is to be transported. The load may also represent external batteries or other types of power sources (e.g., solar panels) that the robotic device 100 may utilize. Carrying the load represents one example use for which the robotic device 100 may be configured, but the robotic device 100 may be configured to perform other operations as well.

As noted above, the robotic system 100 may include various types of legs, arms, wheels, and so on. In general, the robotic system 100 may be configured with zero or more legs. An implementation of the robotic system with zero legs may include wheels, treads, or some other form of locomotion. An implementation of the robotic system with two legs may be referred to as a biped, and an implementation with four legs may be referred as a quadruped. Implementations with six or eight legs are also possible. For purposes of illustration, biped and quadruped implementations of the robotic system 100 are described below.

Figure 2:
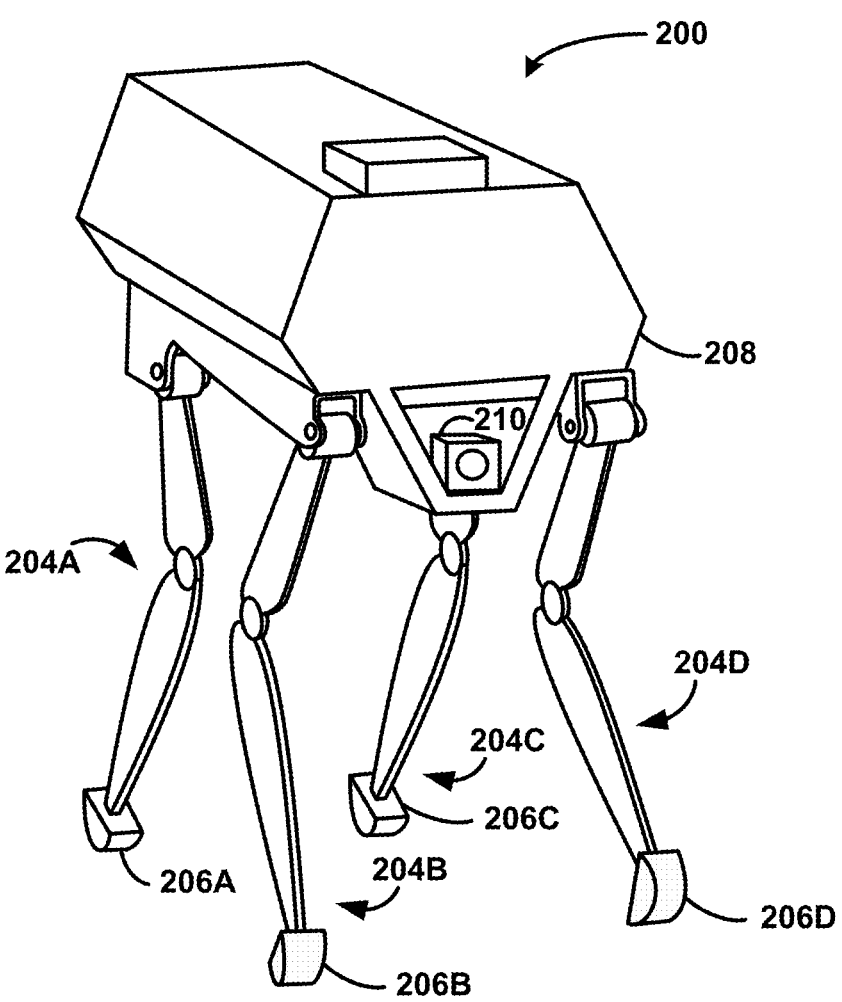
FIG. 2 illustrates a perspective view of a quadruped robot, according to an example implementation.

FIG. 2 illustrates a quadruped robot 200, according to an example implementation. Among other possible features, the robot 200 may be configured to perform some of the operations described herein. The robot 200 includes a control system, and legs 204A, 204B, 204C, 204D connected to a body 208. Each leg may include a respective foot 206A, 206B, 206C, 206D that may contact a surface (e.g., a ground surface). Further, the robot 200 is illustrated with sensor(s) 210, and may be capable of carrying a load on the body 208. Within other examples, the robot 200 may include more or fewer components, and thus may include components not shown in FIG. 2.

The robot 200 may be a physical representation of the robotic system 100 shown in FIG. 1, or may be based on other configurations. Thus, the robot 200 may include one or more of mechanical components 110, sensor(s) 112, power source(s) 114, electrical components 116, and/or control system 118, among other possible components or systems.

The configuration, position, and/or structure of the legs 204A-204D may vary in example implementations. The legs 204A-204D enable the robot 200 to move relative to its environment, and may be configured to operate in multiple degrees of freedom to enable different techniques of travel. In particular, the legs 204A-204D may enable the robot 200 to travel at various speeds according to the mechanics set forth within different gaits. The robot 200 may use one or more gaits to travel within an environment, which may involve selecting a gait based on speed, terrain, the need to maneuver, and/or energy efficiency.

Further, different types of robots may use different gaits due to variations in design. Although some gaits may have specific names (e.g., walk, trot, run, bound, gallop, etc.), the distinctions between gaits may overlap. The gaits may be classified based on footfall patterns—the locations on a surface for the placement the feet 206A-206D. Similarly, gaits may also be classified based on ambulatory mechanics.

The body 208 of the robot 200 connects to the legs 204A-204D and may house various components of the robot 200. For example, the body 208 may include or carry sensor(s) 210. These sensors may be any of the sensors discussed in the context of sensor(s) 112, such as a camera, LIDAR, or an infrared sensor. Further, the locations of sensor(s) 210 are not limited to those illustrated in FIG. 2. Thus, sensor(s) 210 may be positioned in various locations on the robot 200, such as on the body 208 and/or on one or more of the legs 204A-204D, among other examples.

Figure 3:
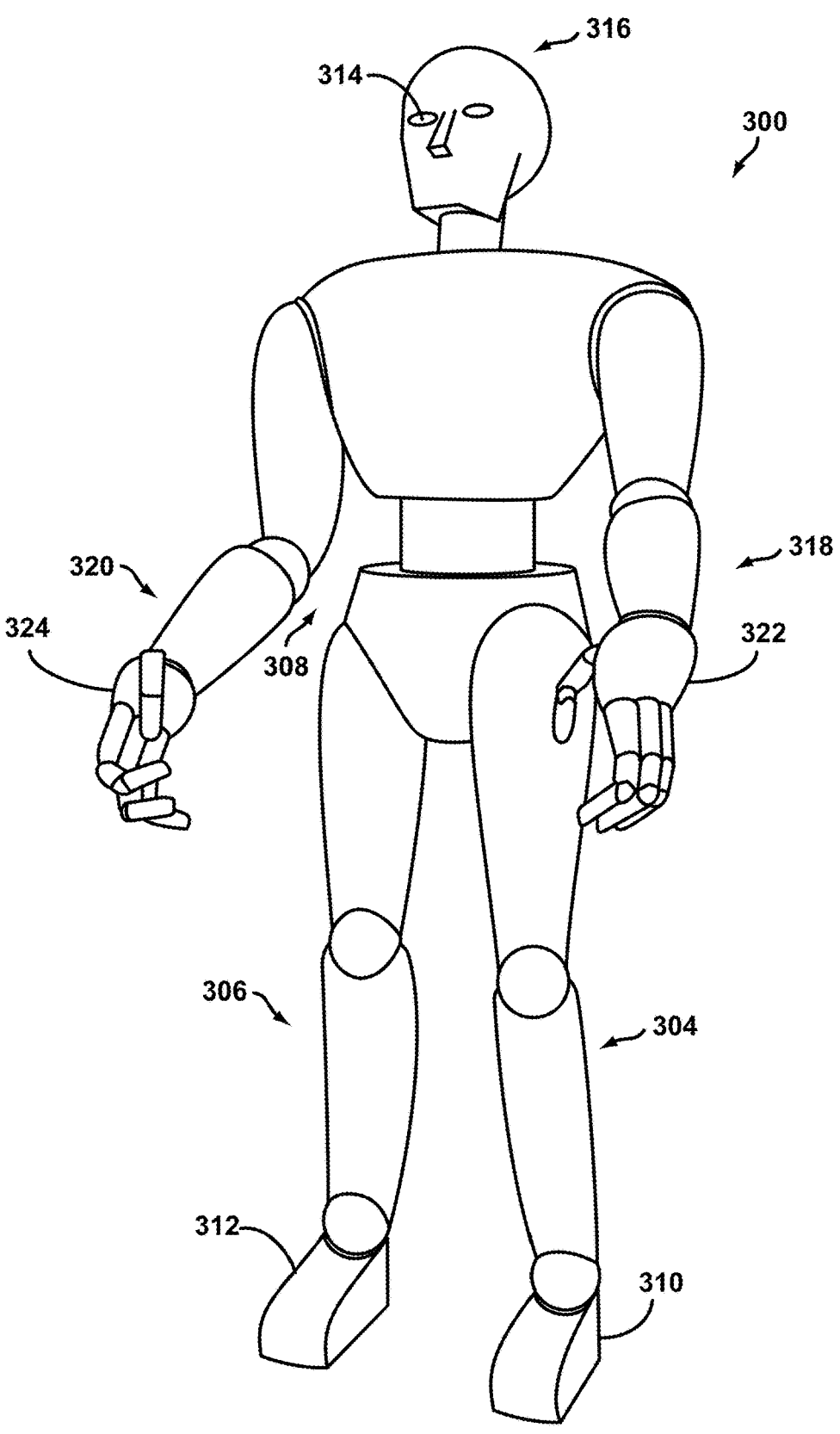
FIG. 3 illustrates another example quadruped robot, according to an example implementation.

FIG. 3 illustrates another example quadruped robot, according to an example implementation. Similarly to robotic device 200 shown in FIG. 2, the robotic device 300 may correspond to the robotic system 100 shown in FIG. 1. The robotic device 300 serves as another possible implementation of a robotic device that may be configured to receive feed-forward control inputs for performing coordinated motion. Other example implementations of robotic devices may exist.

III. Example Systems

Figure 4:
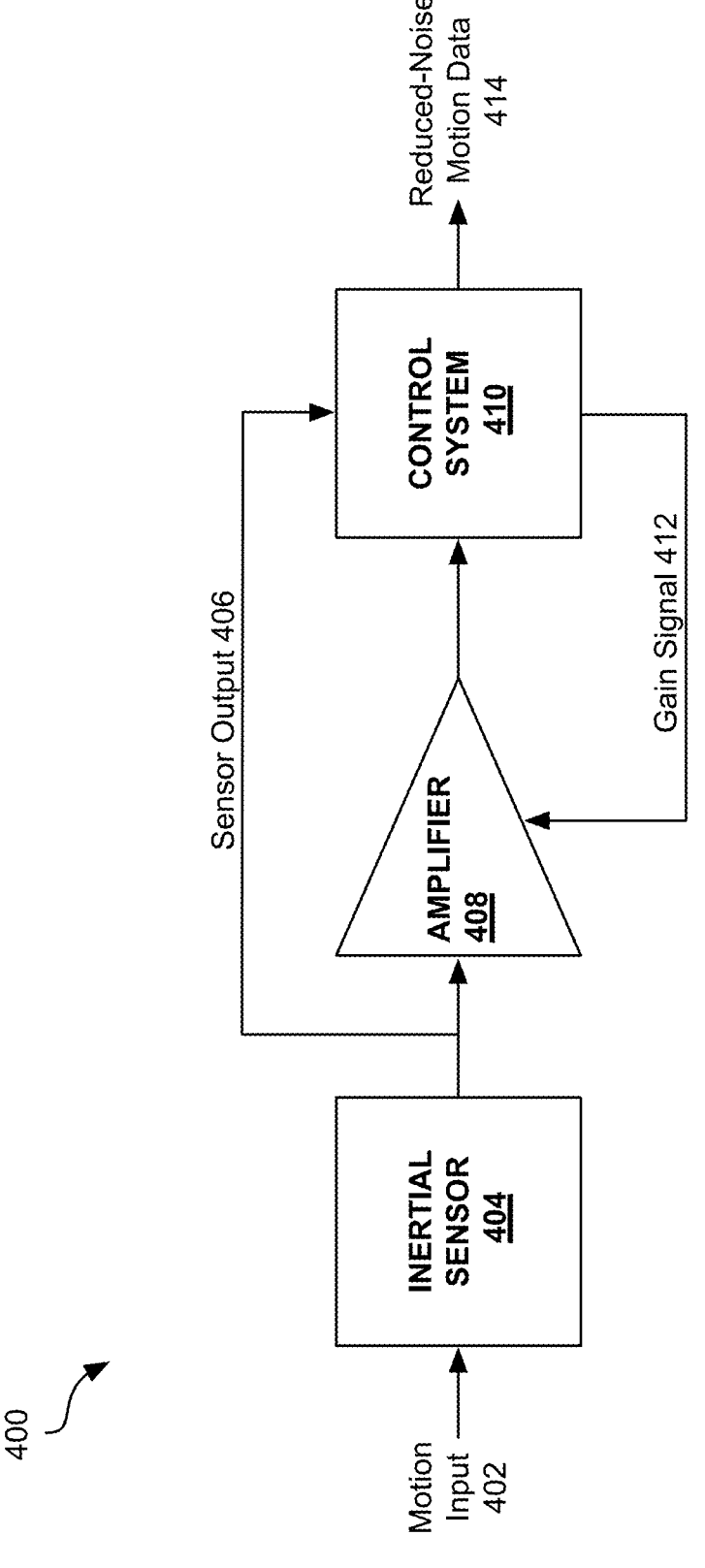
FIG. 4 is a block diagram illustrating a system, according to an example implementation.

FIG. 4 is a block diagram illustrating an example system 400, according to an example implementation. The system 400 includes an inertial sensor 404, an amplifier 408, and a control system 410. The inertial sensor 404 may undergo acceleration in the form of motion input 402, and may subsequently output a signal indicative of that acceleration in the form of sensor output 406. Sensor output 406 may be provided to the amplifier 408 and the control system 410. The amplifier 408 may increase, decrease, or maintain the amplitude where the degree of amplification or attenuation is based on the gain signal 412—of the sensor output 406, the result of which is provided to the control system 410. The control system 410 may determine from one or more sensor or control inputs that the sensor output 406 is (or will) include noise or spurious signals, and accordingly decrease the gain signal 412 to reduce to the amount of amplification performed by amplifier 408. In this manner, the noise or spurious signals may be suppressed (or, at a minimum, at least not amplified) so that they do not adversely impact the control system's operations. As the noise or spurious signals attenuate (if they are transient), the control system 410 may increase the gain signal 412 to return to a nominal level of amplification. The control system 410 then outputs a signal indicative of the amplifier 408 output having a time-varying gain signal 412 that suppresses the noise and/or spurious signals in the form of reduced-noise motion data 414.

In some implementations, the system 400 is a subsystem of or forms a part of a robotic device. The inertial sensor 404 may, for example, be embedded within a limb (e.g., a foot, leg, and/or other appendage) of the robotic device. During operation, the inertial sensor 404 may measure acceleration at such a robotic limb, which is converted into an electrical signal in the form of sensor output 406. In some instances, the movement of the robotic limb is smooth, such that the sensor output 406 is an accurate representation of the acceleration experienced by the inertial sensor 404.

Note that, although examples herein describe inertial sensors being coupled to robotic limbs, some inertial sensors may be coupled to other portions of a robot, such as a robot's body. The location of a particular inertial sensor may depend upon the type of control being carried out by the robot's control system. For example, if the robot's control system is configured to control the orientation of the robot's body, inertial sensors—such as accelerometers, gyroscopes, magnetometers, and/or IMUs—may be coupled to the robot's body. An inertial sensor may be placed at any location on a robot without departing from the scope of present disclosure.

However, abrupt changes in the limb's acceleration (e.g., a robotic foot stepping onto the ground, a robotic arm contacting a hard surface, etc.) may produce vibrations on the robotic limb. These vibrations may be measured by the inertial sensor 404 as an oscillating acceleration and be included in sensor output 406, even though the vibrations do not produce a net acceleration on either the robotic limb and the robot's body. When these vibration measurements are amplified by amplifier 408, the control system 410 may receive a signal indicating that the robot is experiencing an oscillating acceleration. Such spurious acceleration measurements may cause the control system 410 to erroneously perform corrective measures. For example, spurious acceleration measurements may cause the control system 410 to attempt to control the robot's legs to recover from slipping that is not occurring.

The motion input 402 may be any change in translational and/or angular position experienced by the inertial sensor 404 over a period of time. In some cases, the motion input 402 is an acceleration caused by the actuation of a robotic limb to which the inertial sensor 404 is affixed. The motion input 402 may also include net-zero motion, such as vibration of the robotic limb which may take the form of an oscillating acceleration.

The inertial sensor 404 may be any sensor, sensing device, measurement device, or some combination thereof that measures translational and/or angular movement, velocity, and/or acceleration. As one example, the inertial sensor 404 may include a combination of accelerometers (e.g., three accelerometers to measure translational acceleration in three dimensions). The inertial sensor 404 may also include a combination of gyroscopes and/or magnetometers in order to measure changes in angular position, velocity, and/or acceleration. Regardless of the particular sensors and measuring devices employed, the inertial sensor 404 may be a measurement device that converts motion (e.g., acceleration) into an electrical signal representative of that motion (e.g., with the amplitude of the signal corresponding to the magnitude of the measured acceleration).

The sensor output 406 may be any signal representative of the measurements taken by the inertial sensor 404. In some instances, the sensor output 406 is an electrical signal carried through a conductive wire. In other instances, the sensor output 406 is an electromagnetic signal transmitted wirelessly to other components, such as the control system 410. The sensor output 406 may be an analog or digital signal, depending upon the particular implementation.

The amplifier 408 may be any electronic device that can increase (or decrease) the power of the sensor output 406. The amount of amplification may depend on a variety of factors, including the magnitude or value of the gain signal 412. In some implementations, the amplifier 408 may be an analog device, receiving an analog sensor output 406 and analog gain signal 412, and subsequently outputting an analog signal representing an amplified sensor output 406. In other implementations, the amplifier 408 may include digital components that allow the operating parameters of the amplifier 408 to be set by the control system 410 (e.g., a digital gain signal 412 specifying the degree of amplification).

The control system 410 may be any processing device that receives sensor measurements and other signals and controls the amplification of the amplifier 408. The control system 410 may receive both the sensor output 406 and the output of the amplifier 408, which may be analyzed by the control system 410 to determine the gain signal 412 to provide back to the amplifier 408. For example, the control system 410 may determine that the inertial sensor 404 is experiencing vibrations that are producing spurious signals, and subsequently reduce the amplification by modifying the gain signal 412 provided to the amplifier 408. As those vibrations attenuate, the control system 410 may ramp up the gain signal 412 from a reduced gain value to a nominal gain value.

The control system 410 may store one or more gain signal "profiles" that describe a manner in which to vary the gain signal 412 over a specified period of time. An example profile may be to increase the gain signal 412 linearly from a reduced gain value to a nominal gain value over a period of one second. Another example profile may be to increase the gain signal 412 exponentially from a reduced gain value to a nominal gain value over a period of two seconds. A gain signal profile may correspond to a particular robotic device configuration and account for spurious signals produced by that particular robot's walking gait. Other gain signal profiles are possible, and are discussed in greater detail below.

Initiating the application of a gain signal profile may be triggered by an event, such as detecting a sudden change in acceleration or the occurrence of a specific time at which a sudden change in acceleration is expected (e.g., an expected footstep due to a steady walking gait). For example, during a walking operation, a robotic device swings its foot forward before it touches down onto the ground. As the foot approaches the ground, a measured acceleration would indicate a downward acceleration (with respect to an axis perpendicular to the ground). Then, when the foot contacts the ground, the acceleration would abruptly change to a zero acceleration (with respect to an axis perpendicular to the ground), notwithstanding the acceleration due to gravity. This sudden change in acceleration may indicate a footstep, which may produce transient vibrations at the robotic foot. Thus, the control system 410 may initiate the application of a gain signal profile responsive to such an event.

As a result of providing a time-varying gain signal 412, the amplifier 408 may output acceleration measurements that have a reduction in noise and spurious measurements, compared to acceleration measurements that would have been produced with a constant gain signal 412. The control system 410 may then process those acceleration measurements and provide output signals (either analog or digital) of the instantaneous acceleration, velocity, and or position of the robotic limb to which the inertial sensor 404 is affixed. These signals output by the control system 410—which may be collectively referred to as reduced-noise motion data 414—may be provided to other control systems, processing devices, and/or computing devices, and may be used by those devices in controlling the robot and/or determining operations for the robot to perform.

Other components—in addition to those illustrated in FIG. 4—may be included in the system 400. For example, a filter may be included at any place within the system 400 to remove or reduce the amplitude of signals within certain frequency ranges. Some example filters include low-pass filters, band-pass filters, and high-pass filters, among other possible filters. A filter may be implemented in software, hardware (e.g., passive components, integrated circuits, etc.), or some combination thereof.

As described herein, sensor, amplifier, and control system outputs may be referred to as "outputs," "signals," and/or "data." In some instances, a device may output a time-varying analog voltage signal representing the sensor measurement; in other instances, a device might output a time-varying digital voltage signal representing the sensor measurement. Whether a signal is digital or analog depends upon the particular implementation. For example, some amplifiers may be designed to receive an analog voltage to set the amplifier's gain, while other amplifiers may be designed to receive a digital signal that programs the amplifier's gain. It should be understood the noise and spurious signal suppression techniques disclosed herein may be implemented using any combination of analog and/or digital devices, without departing from the scope of the present application.

Other systems may be configured to include additional or fewer components than those present in system 400. For example, some systems might include additional sensors, amplifiers, control devices, signal combiners, integrators, differentiators, filters, computing devices, and/or other components. Some systems might also include additional feedback loops, feed-forward loops, and/or other signal paths between various components or devices.

Example Robotic Devices

Figure 5:
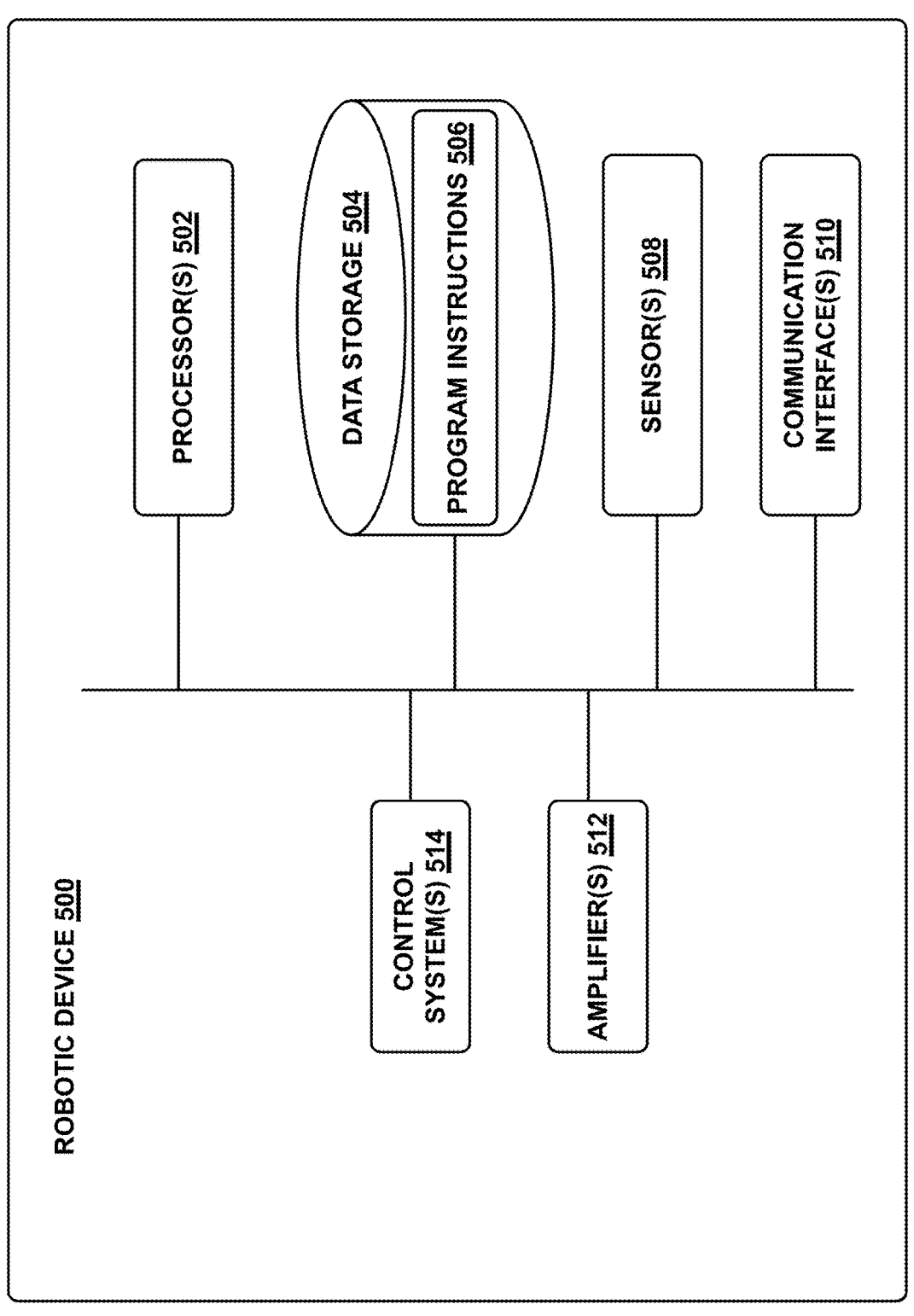
FIG. 5 is a schematic block diagram illustrating an example robotic device, according to an example implementation.

FIG. 5 is a schematic block diagram illustrating an example robotic device 500, according to an example implementation. The robotic device 500 includes processor(s) 502, data storage 504, program instructions 506, sensor(s) 508, communication interface(s) 510, amplifier(s) 512, and control system(s) 514. Note that the robotic device 500 is shown for illustration purposes and may include additional components and/or have one or more components removed without departing from the scope of the disclosure. For example, the robotic device 500 may include robotic limbs, appendages, legs, feet, actuators, cameras, and/or computing devices, among other possible components. Further, it should be understood that the various components of robotic device 500 may be arranged and connected in any manner.

Moreover, the above description of processor(s), data storage, program instructions, sensors, and/or communication interface(s) may apply to any discussion below relating to the respective component being used in another system or arrangements. For instance, as noted, FIG. 5 (among other possible figures) illustrates processors, data storage, program instructions, sensors, and/or communication interface(s) as being incorporated in another arrangement. These components may thus take on the same or similar characteristics (and/or form) as the respective components discussed above in association with FIG. 1. However, the components at issue could also take on other characteristics (and/or form) without departing from the scope of the disclosure.

The amplifier(s) 512 may be any electronic device or devices that facilitates the increase (or decrease) in power of a signal. In some implementations, amplifier(s) 512 may include a combination of transistors and passive components (e.g., resistors, capacitors, inductors, etc.), which collectively form an operational amplifier, power amplifier, transistor amplifier, or any other type of amplifier. The amplifier(s) 512 may be coupled with one or more of the sensor(s) 508 and configured to alter the power of the signals output by sensor(s) 508. The amplifier(s) 512 may include, at a minimum, an input terminal, an output terminal, and a gain terminal that specifies the degree of amplification between the input and output terminals.

In some instances, the amplifier(s) 512 may include digital components that can be programmed or otherwise digitally controlled to set the gain values of those amplifier(s) 512. For example, processor(s) 502 or other devices may provide to the amplifier(s) 512 a digital signal containing information (e.g., as digital bits) specifying the amount of amplification to effect onto an input signal. In other instances, the amplifier(s) 512 may include memory and/or other digital components to store gain value profiles, which may be carried out as a result of a triggering event or as a result of an instruction by processor(s) 502 or another device.

The control system(s) 514 may be any electronic device that processes signals from sensor(s) 508 and/or amplifier(s) 512, and may alter the operation of one or more components of robotic device 500 based on those signals. For instance, the control system(s) 514 may determine that a foot of the robotic device 500 has contacted the ground, and accordingly may begin applying a gain value profile over a period of time to the amplifier(s) 512 to suppress the measurement of vibrations and/or other spurious signals. The control system(s) 514 may receive measurements from sensor(s) 508 (either directly or amplified by amplifier(s) 512), and may cause one or more actuators of robotic device 500 to act based on the measurements.

The control system(s) 514 may also effect control actions to balance the robotic device 500 or cause the robotic device 500 to walk or run in accordance with a particular gait, among other possible control actions. In some cases, some control system(s) 514 may suppress measurement noise from sensor(s) 508 (e.g., using techniques disclosed herein), while other control system(s) 514 carry out control actions based on the reduced-noise motion information. Although the present application describes control systems as carrying out methods and techniques for suppressing spurious motion measurements, it should be understood that a control system (or combination of control systems) may carry out high level robotic operations as well.

Example Amplification with Time-Varying Gain

Figure 6:
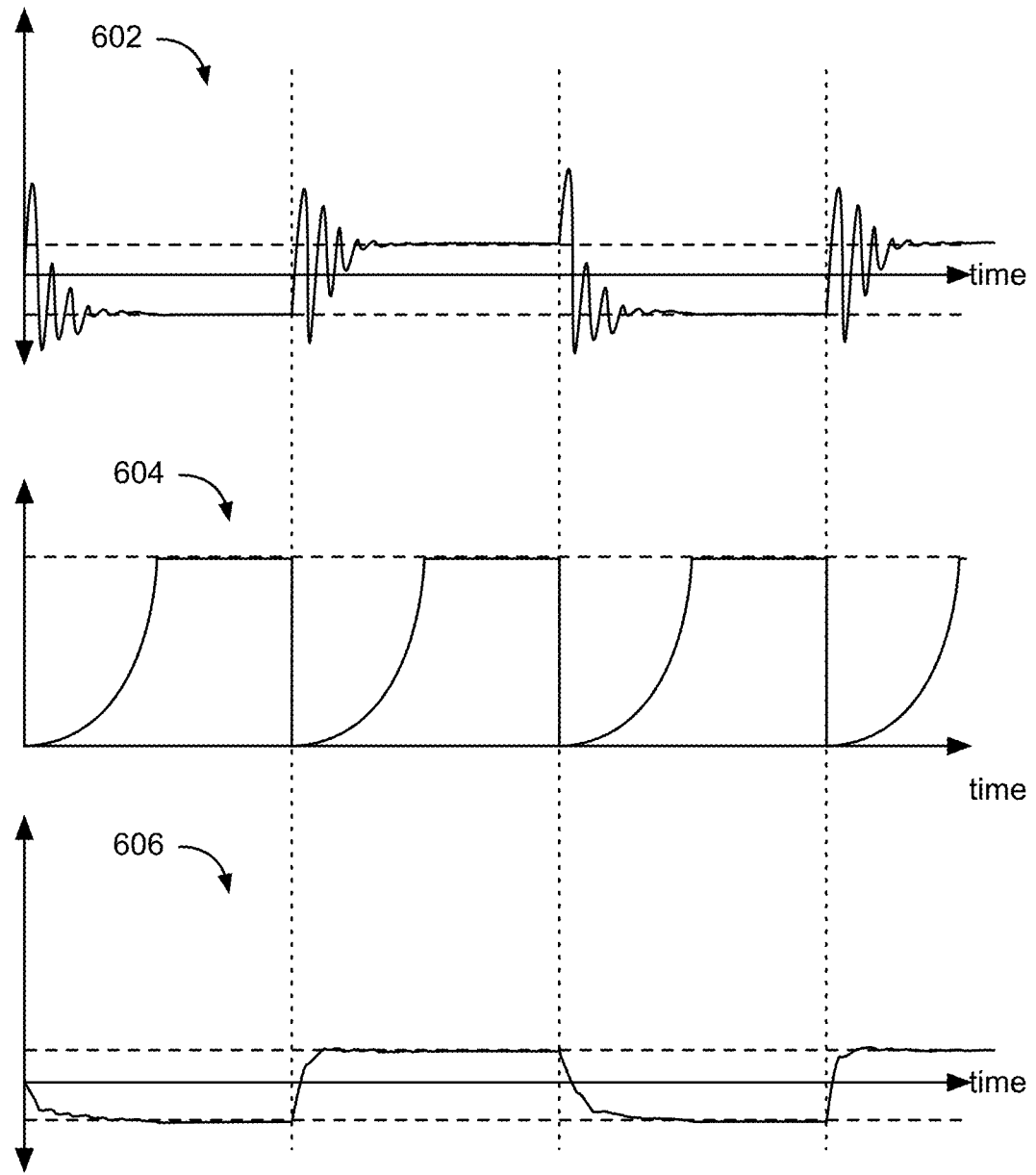
FIG. 6 illustrates a sensor output waveform, an example profile waveform, and an example reduced-noise sensor output, according to an example implementation.

FIG. 6 illustrates an example sensor output waveform 602, an example profile waveform 604, and an example reduced-noise sensor output 606, according to an example implementation. The example sensor output waveform 602 may represent one example of motion input 402 as described with respect to FIG. 4. The example profile waveform 604 may represent an example time-varying gain value profile of gain value 412 as described with respect to FIG. 4. The example reduced-noise senor output 606 may represent one example of reduced-noise motion data 414, as described with respect to FIG. 4. Note that some features or waveform artifacts may be exaggerated in the waveforms. It should be understood that the waveforms may not necessarily be drawn to scale, and are provided for illustration and explanatory purposes.

The sensor output waveform 602 illustrates the acceleration of a foot as a robotic device carries out a walking operation. As the robotic device walks, the foot contacts the ground at discrete points in time, after which transient oscillatory accelerations are measured. The acceleration oscillations may attenuate over time until the sensor output reaches a steady-state value.

As described herein, a "steady-state" value may refer to a sensor output that does not include spurious sensor readings and/or oscillations. In some cases, a steady-state value may be constant (e.g., the acceleration of a robot's planted foot). In other cases, a steady-state value may change as a result of changing accelerations, where the measured acceleration is due to a net acceleration at the robot (and not spurious or oscillatory acceleration measurements). In yet further cases, a steady-state value may include spurious or oscillatory acceleration measurements that have a magnitude below a threshold level (that is, the spurious or oscillatory acceleration measurements have dissipated to an acceptable magnitude). A steady-state value may take on any value without departing from the scope of the present disclosure.

The profile waveform 604 illustrates a time-varying gain value that is applied to an amplifier into which the sensor output waveform 602 is input. The profile waveform 604 in this example increases exponentially from a reduced gain value (which may be zero gain or some other gain value) to a nominal gain value (which may be a gain of 1 or some other gain value greater than 1). In this example, the length of time over which the gain increases from the reduced value to the nominal value may be approximately the same length of time over which the the acceleration oscillation in the sensor output waveform 602 attenuates to a steady-state value (or, to a point at which the magnitude of the acceleration oscillations decreases below a threshold magnitude).

When the signal in sensor output waveform 602 is amplified using a gain value as illustrated in profile waveform 604, the oscillations in sensor output waveform 602 are attenuated approximately in accordance with their magnitude. Directly after a foot contacts the ground, the gain value is dropped to a reduced value, thereby causing the initial oscillations (which have the largest magnitude over the period of a single step cycle) to be significantly suppressed. As the oscillations dissipate over time, the gain value is ramped up.

The reduced-noise sensor output 606 represents the sensor output waveform 602 having been amplified (or suppressed) by an amplifier according to a gain specified by the profile waveform 604. Compared to the sensor output waveform 602, the reduced-noise sensor output 606 does not contain large swings in measured acceleration, which might otherwise adversely impact robotic control and could potentially cause a control system to effect unnecessary robotic control.

Figure 7A:
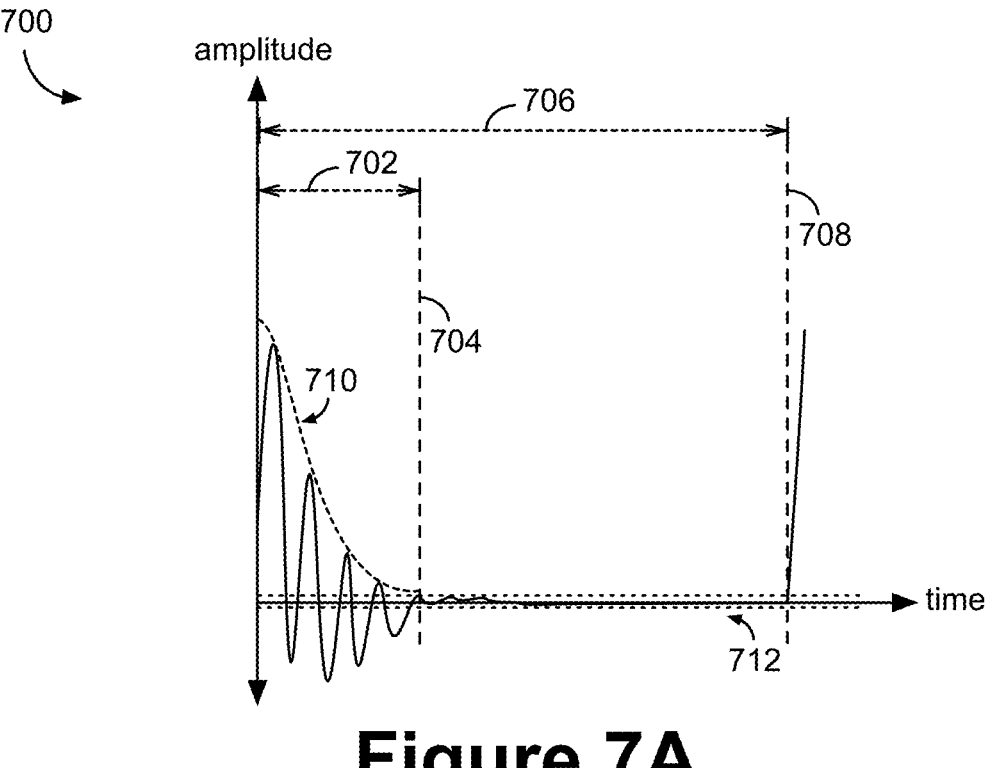
FIG. 7A illustrates a portion of a sensor output waveform, according to an example implementation.
Figure 7B:
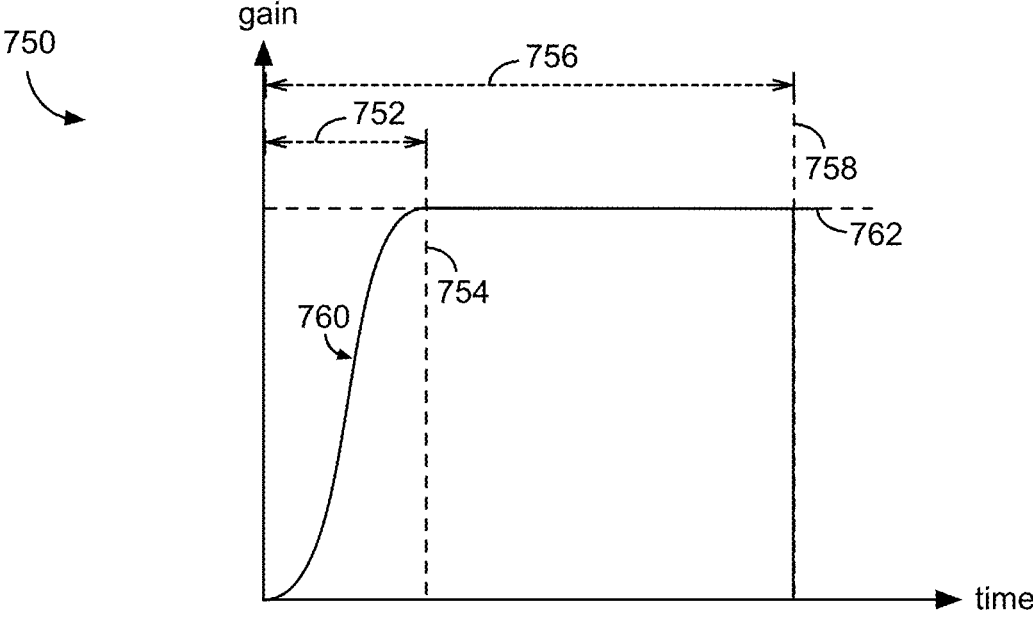
FIG. 7B illustrates a profile waveform, according to an example implementation.

FIGS. 7A and 7B and the following description illustrate the parameters of a signal waveform and a gain profile in greater detail. In some implementations, a repetitive robotic operation (such as a footstep) may be characterized in order to determine a gain profile to effectively suppress the spurious signals. For example, the sensor measurements following a footstep may reveal the magnitude of amplitude oscillations, the duration of those oscillations, and the manner in which those oscillations attenuate. These characteristics may be used to generate a gain profile that applies an adequate amount of gain suppression for an appropriate length of time.

FIG. 7A illustrates an example portion of a sensor output waveform 700, according to an example implementation. The sensor output waveform 700 includes two sections: a period of oscillation 710 following the footstep, and a period of steady-state measurements 712 after the oscillations have sufficiently dissipated. The period of oscillation 710 may be defined, in some instances, as beginning immediately when the foot contacts the ground and the oscillations begin, and ending when the magnitude of the oscillations drops below a threshold magnitude (at time 704 in FIG. 7A), such that the period of oscillation occurs over time period 702. The period of steady-state measurements 712 may continue following time 704 until the next footstep occurs at time 708. Collectively, the period of oscillation 710 and the period of steady-state measurements 712 occur over a step cycle period 706.

A waveform envelope of the sensor output waveform 700 during the period of oscillation 710 may be determined (illustrated as a dashed curve touching the peaks of the oscillation). That portion of the sensor output waveform 700 may be provided to an envelope detector or processed by a computing device to characterize the envelope. For example, the envelope may be represented as a discrete time function, where a discrete time values are paired with amplitude values. The waveform envelop may characterize the spurious oscillations, such that a corresponding gain profile can be generated that provides an amount of gain or suppression proportionate to the magnitude of the oscillations.

FIG. 7B illustrates an example profile waveform 750, according to an example implementation. In this example, profile waveform 750 may have been generated based on determined characteristics of the sensor output waveform 700. The duration 756 of the profile waveform 750 may be designated based on the determined step cycle period 706. The duration 752 of the profile waveform 750 may be designated based on the time period 702 of the period of oscillation 710. Additionally, in some implementations, the shape and duration of the ramping (i.e., time-varying increase) portion 760 of the profile waveform 750 may be designated based on the determined characteristics of the period of oscillation 710 (e.g., the waveform envelope of the period of oscillation 710).

Generating the ramping portion 760 of the profile waveform 750 may involve inverting and/or transforming the determined waveform envelope of the period of oscillation 710, such that the ramping portion 760 increases from a reduced gain value to a nominal gain value in a manner approximately proportionate with the waveform envelope of the period of oscillation 710. Defining the ramping portion 760 in this manner may approximately attenuate spurious oscillations at a magnitude and rate that "matches" (that is, appropriately suppresses or negates) the spurious oscillations themselves.

In some implementations, the gain profile may be generated based on the amount of force applied by a robotic foot onto a surface. Stronger or more forceful stepping may cause larger vibrations to be produced on the robotic leg compared to weaker or softer stepping. Thus, the degree of gain "damping" to apply may depend on the amount of force applied by a robotic foot onto the ground (e.g., running might induce larger vibrations compared to walking).

In some implementations, the ramping portion 760 may not necessarily be designated to match the characteristics of measured spurious oscillations. For example, the ramping portion 760 may be determined based on some function (e.g., a linear function, a quadratic function, an exponential function, etc.) or combination of functions. As another example, the ramping portion 760 could be hand-tuned by a technician or operator of the robotic device. In some instances, a human technician or operator may examine previously measured waveforms and may manually designate the parameters of the ramping portion 760.

The ramping portion 760 may also be determined based on data analyses or as a result of computational processes applied to multiple previously-recorded measurements. For instance, parameters described with respect to FIG. 7A may be determined for a hundred previous measurements, and the average of those parameters may be used to generate the ramping portion 760. Such parameter values could also be determined by employing machine learning processes to sensor measurement data. A machine learning tool might be used to determine characteristics of previously-recorded measurements, which may then serve as a basis for determining a gain profile.

In some cases, the ramping portion 760 may be parameterized, such that its waveform "function" (the association of a gain value with a time value) may be defined by one or more parameters. Such parameterization may allow the gain profile to be tuned while the robotic device is operating. For example, a first set of parameters may accurately suppress oscillations produced by a robot walking on grass, while a second set of parameters may accurately suppress oscillations produced by a robot walking on pavement. A control system of the robotic device may, for instance, determine which type of surface it is walking on and apply a predetermined set of parameters based on the determined surface type.

In various implementations, a robotic device may be communicatively connected with other computing devices or data sources (e.g., a "cloud" service) through which ramping portion 760 information may be retrieved and applied to its amplifiers. Other robotic devices may measure sensor data, which could be aggregated on a server or computing device and analyzed to determine waveforms or functions corresponding to different robotic configurations, walking gaits, environments, and/or surface types. The robotic device may retrieve configurations for ramping portion 760 from such a cloud service.

Although the above description relates to an example in which a robotic device's foot steps onto a surface, thereby producing oscillations, the spurious signal suppression techniques may be applied to a variety of sensor measurements resulting from any kind of operation. For example, an articulated robotic arm may contact an object during an operation, and that contact may generate spurious oscillations. The spurious signal suppression techniques may be applied to other scenarios without departing from the scope of the disclosure.

Example Methods

FIG. 8 is a flowchart of operations 800 for suppressing spurious measurements of a sensor coupled to a robotic device, according to an example implementation. Operations 800 shown in FIG. 8 present an implementation that could be used by computing devices or control systems. Operations 800 may include one or more actions as illustrated by blocks 802 808. Although the blocks are illustrated in sequential order, these blocks may also be performed in parallel, and/or in a different order than those described herein. Also, the various blocks may be combined into fewer blocks, divided into additional blocks, and/or removed based upon the directed implementation.

In addition, the operations 800 and other operations disclosed herein show functionality of one possible implementation. In this regard, each block may represent a module, a segment, or a portion of program code, which includes one or more instructions executable by a processor or computing device for implementing specific logical operations or steps. The program code may be stored on any type of computer-readable medium, for example, such as a storage device included in a disk or hard drive. The computer-readable medium may include a non-transitory computer-readable medium, for example, such as computer-readable media that stores data for short periods of time like register memory, processor cache and/or random access memory (RAM). The computer-readable medium may also include non-transitory media, such as secondary or persistent long-term storage, like read-only memory (ROM), optical or magnetic disks, and compact-disc read-only memory (CD-ROM), for example. The computer-readable media may be considered a computer-readable storage medium, for example, or a tangible storage device.

In addition, one of more blocks in FIG. 8 may represent circuitry that is wired to perform the specific logical operations.

A. Determining that a Foot is Making Initial Contact with a Surface

Block 802 involves determines that a foot of a legged robot is making initial contact with a surface. Determining that the foot of a legged robot is making initial contact with a surface may involve detecting the occurrence of a triggering event. A triggering event may be any kind of event that indicates that spurious oscillations are likely to begin (or have already begun). For instance, if a robotic device is walking according to a gait that has an even step cycle (e.g., two seconds between each footstep), then the triggering event could be the points in time at which the robotic device's feet are expected to contact the ground. As another example, the triggering event may be the occurrence of a footstep, which may be determined based on, for example, a sudden change in acceleration as a foot (along at least one axis). Detecting the occurrence of a footstep may also be performed in other ways. Additionally, a footstep may occur as a result of an explicit instruction by a control system to actuators that control the robot's feet, and the issuance of that instruction could serve as the triggering event.

The control system includes a feedback loop, which may include an amplifier, which operates according to a gain value (which may serve as the "feedback" of the loop). Prior to block 804 (or prior to block 802, depending upon the particular implementation), the gain value provided by the control system to the amplifier may be set to a nominal value. The nominal value may be a particular voltage level in an analog system, or may be a digital representation of the nominal gain value in a digital system. Regardless of the particular implementation, the control system may provide a nominal gain value to the amplifier in the feedback loop prior to block 804.

B. Reducing a Gain Value of an Amplifier

Block 804 involves reduces a gain value of an amplifier of the control system from a nominal value to a reduced value. The amplifier may receive the measurements from an inertial sensor and provide a modulated output based on the gain value. Depending upon the particular implementation, the reduced value may be zero or some or some other value (e.g., less than "1", where "1" represents a pass-through with no amplification or suppression). In some instances, the gain may be instantaneously (or as quickly as the control system can operate) reduced from the nominal value to the reduced value. In other instances, the gain may be reduced over a period of time.

Reducing the gain value to a reduced value may be referred to herein as "initiating the application of a gain signal profile." In other words, block 804 may represent an initial step of applying a gain profile, where the gain value is reduced and then ramped up over a period of time and in a manner specified by the gain profile. Once the gain value has been reduced at block 804 and the control system has initiated the application of a gain profile, the method 800 proceeds to block 806.

C. Over a Predetermined Duration of Time after Detecting the Occurrence, Increasing the Gain Value According to a Profile Block 806 involves increases the gain value from a reduced value to the nominal value according to a profile over a predetermined duration of time after detecting the occurrence. As described above, the manner in which the gain value is increased is specified by the gain profile. An example predetermined duration of time may be similar to duration 752 of the profile waveform 750 illustrated in FIG. 7A.

In some implementations, the gain value may be a function that associates time (relative to the initiation of applying the gain profile) with a gain value. In such implementations, determining the gain value to provide to the amplifier may involve determining a discrete time value (with respect to the initiation of applying the gain profile) and providing that discrete time value to the gain profile function. This step may be repeated at regular time intervals by the control system to perform a "step-wise" or "piecewise" application of the time-varying gain value. In some implementations, the gain value may be smoothed out by a digital-to-analog converter employing a reconstruction filter, thereby supplying an analog gain value based on a digital gain value function.

Regardless of the particular implementation, the gain value may be increased over a period of time. The duration of this period of time may, for example, correspond to the time period 702 of the period of oscillation 710 of FIG. 7A (which in turn corresponds to duration 752 of the profile waveform 750).

D. Controlling at Least One Actuator of the Legged Robot

Block 808 involves controlling at least one actuator of the legged robot based on the modulated output. The modulated output of the amplifier may, in some instances, mitigate the magnitude of noise and other spurious signals provided to the amplifier, as compared to the signal input into the amplifier.

A control system or other processing device may receive the modulated output, which might serve as a basis for administering control to one or more actuators of the legged robot. For example, the modulated output may represent acceleration experienced at a legged robot. That acceleration might be evaluated by the control system in determining the legged robot's position, velocity, state of balance, or other aspects of the legged robot's kinematic state. Additionally, aspects of the legged robot's kinematic state might serve as a basis for determining parameters for the control system, selecting a particular controller that specifies a robot's behavior, and/or to determine a task (or sequence of tasks) for the robot to carry out, among other possible determinations.

After the predetermined duration of time elapses, the gain value may be set to a constant nominal value until the control system determines that the foot of the legged robot is making initial contact with the surface again. Then, the method 800 may repeat performing blocks 802-808.

Example State Estimation

Measurements from inertial sensors may serve as a basis for determining the state of a robot. As described herein, the "state" of a robot may refer to a robot's kinematic state, such as a robot's position, velocity, acceleration, orientation, angular velocity, and/or angular acceleration. The "state" of a robot may also refer inferences drawn on the basis of the robot's kinematic state. For example, an inertial sensor might measure acceleration at a location on a robot, which might be used to determine whether or not the robot is slipping.

As described above, the stepping of a legged robot might cause vibrations on the robot's body, which can lead to spurious measurements captured by inertial sensors. Inertial information with spurious measurements could lead to inaccurate estimations of the robot's state. For example, some spurious measurements might indicate that a robot is accelerating, even if the robot is actually stationary. As the source of the spurious measurements dampen over time, the estimated state of the robot may improve (that is, the estimated state of the robot may be more representative of the actual state of the robot).

The estimated state of the robot may be provided to a control system or other device, which may then cause one or more actuators of the robot to act. As one example, a control system might be configured to maintain a legged robot's balance. If the control system receives an estimated state of the robot indicating that the robot is slipping, that control system might cause actuators on the robot's legs to operate in such a way that causes the robot to restore its balance. If the control system in this example receives an inaccurate robot state (e.g., due to spurious measurements adversely affecting the accuracy of the estimation of the robot's state), it may cause the robot to carry out an unnecessary or incorrect action.

Estimating the state of the robot may be performed periodically, or responsive to the occurrence of an event. In some implementations, estimating the state of the robot may be delayed for a period of time (e.g., a predetermined duration of time) after the robot's foot makes contact with a surface. In this manner, inaccurate state estimation may be prevented which might otherwise cause a control system to act on the basis of spurious measurements. In some instances, the period of time may extend from the moment that the robot's foot touches the surface to a point in time when the magnitude of the spurious measurements has decreased below a threshold magnitude. In other instances, the period of time may be a predetermined duration, which may be determined based on analyses of previously-captured data (e.g., using machine learning).

In some implementations, a control system may determine that a robot is slipping based on measurements captured by two different sensors. For example, one measurement may represent kinematics of a stance leg (e.g., the "planted" stationary leg) of the robot, while the other measurement might represent the acceleration of the robot's body. If the kinematics of the stance leg represent an outward acceleration at that leg while the acceleration of the robot's body is zero (or constant with respect to gravity), a control system may determine that the robot is slipping. In this example, if an estimated state of the robot includes spurious measurements, the control system may determine that the robot is slipping when it is actually stable. By delaying the estimation of the robot's state for a period of time after the robot's foot touches the surface, unnecessary corrective actions by the robot may be prevented.

Example Computer-Readable Medium

Figure 9:
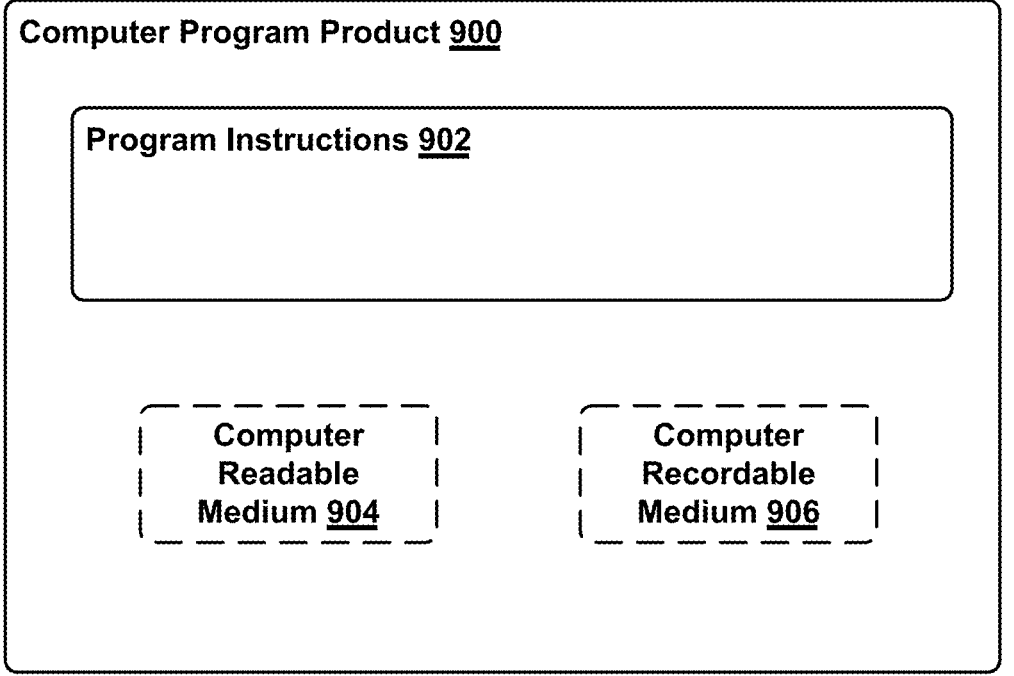
FIG. 9 is a block diagram of a computer-readable medium according to an example implementation.

FIG. 9 illustrates an example computer-readable medium configured according to at least some implementations described herein. In example implementations, the example system can include one or more processors, one or more forms of memory, one or more input devices/interfaces, one or more output devices/interfaces, and machine readable instructions that when executed by the one or more processors cause a robotic device to carry out the various operations, tasks, capabilities, etc., described above.

As noted above, the disclosed procedures can be implemented by computer program instructions encoded on a computer-readable storage medium in a machine-readable format, or on other media or articles of manufacture. FIG. 9 is a schematic illustrating a conceptual partial view of a computer program product that includes a computer program for executing a computer process on a computing device, arranged according to at least some implementations disclosed herein.

In some implementations, the example computer program product 900 may include one or more program instructions 902 that, when executed by one or more processors may provide functionality or portions of the functionality described above with respect to FIG. 18. In some examples, the computer program product 900 may include a computer-readable medium 904, such as, but not limited to, a hard disk drive, a Compact Disc (CD), a Digital Video Disk (DVD), a digital tape, memory, etc. In some implementations, the computer program product 900 may include a computer recordable medium 906, such as, but not limited to, memory, read/write (R/W) CDs, R/W DVDs, etc.

The one or more program instructions 902 can be, for example, computer executable and/or logic implemented instructions. In some examples, a computing device is configured to provide various operations, or actions in response to the program instructions 902 conveyed to the computing device by the computer readable medium 904 and/or the computer recordable medium 906. In other examples, the computing device can be an external device in communication with a device coupled to the robotic device.

The computer readable medium 904 can also be distributed among multiple data storage elements, which could be remotely located from each other. The computing device that executes some or all of the stored instructions could be an external computer, or a mobile computing platform, such as a smartphone, tablet device, personal computer, a robot, or a wearable device, among others. Alternatively, the computing device that executes some or all of the stored instructions could be a remotely located computer system, such as a server. For example, the computer program product 900 can implement operations discussed in reference to FIGS. 1-8.

CONCLUSION

It should be understood that arrangements described herein are for purposes of example only. As such, other arrangements and other elements (e.g. machines, interfaces, operations, orders, and groupings of operations, etc.) can be used instead, and some elements may be omitted altogether. Further, many of the elements that are described may be implemented as discrete or distributed components or in conjunction with other components, in any suitable combination and location, or other structural elements described as independent structures may be combined.

While various aspects and implementations have been disclosed herein, other aspects and implementations will be apparent to those skilled in the art. The various aspects and implementations disclosed herein are for purposes of illustration and are not intended to be limiting, with the true scope being indicated by the following claims, along with the full scope of equivalents to which such claims are entitled. It is also to be understood that the terminology used herein is for the purpose of describing particular implementations only, and is not intended to be limiting.

What is claimed is:

1. A method comprising:

receiving, as an input to an analog electronic amplifier of a legged robot, a sensor output signal from a sensor of the legged robot;

determining, by a control system of the legged robot, that the sensor output signal comprises a signal fluctuation indicative of a vibration arising from a foot of the legged robot contacting a surface;

determining, by the control system, a gain signal profile for the analog electronic amplifier based on the sensor output signal and one or more characteristics of a set of sensor measurement data;

controlling, by the control system, a gain value of the analog electronic amplifier according to the gain signal profile to suppress the signal fluctuation in the sensor output signal; and controlling, by the control system, an actuator of the legged robot based on an output of the analog electronic amplifier.

2. The method of claim 1, further comprising reducing, by the control system, the gain value of the analog electronic amplifier from a nominal gain value to a reduced gain value over a period of time indicated by the gain signal profile.

3. The method of claim 2, further comprising increasing, by the control system, the gain value of the analog electronic amplifier from the reduced gain value to the nominal gain value based on detecting an attenuation of the signal fluctuation.

4. The method of claim 1, further comprising determining, by the control system, the gain signal profile further based on a gait of the legged robot.

5. The method of claim 1, further comprising determining, by the control system, the gain signal profile based on selecting the gain signal profile from two or more gain signal profiles, wherein a first gain signal profile of the two or more gain signal profiles is associated with an exponential change in the gain value over time, and wherein a second gain signal profile of the two or more gain signal profiles is associated with a linear change in the gain value over time.

6. The method of claim 1, further comprising determining, by the control system, the gain signal profile further based on detecting an attenuation of the signal fluctuation.

7. The method of claim 1, wherein the sensor is an inertial sensor.

8. The method of claim 1, further comprising controlling, by the actuator, the foot of the legged robot.

9. The method of claim 1, wherein the analog electronic amplifier is configured to adjust a power of the sensor output signal, wherein an amount of adjustment of the power is based on one or more parameters including the gain value of the analog electronic amplifier.

10. The method of claim 1, wherein the control system determines the gain signal profile using machine learning.

11. The method of claim 1, wherein the set of sensor measurement data comprises a set of previously-recorded measurements from one or more sensors.

12. A legged robot comprising:

a sensor configured to generate a sensor output signal;

an analog electronic amplifier having an input configured to receive the sensor output signal;

an actuator; and a control system configured to determine that the sensor output signal comprises a signal fluctuation indicative of a vibration arising from a foot of the legged robot contacting a surface, and to determine a gain signal profile for the analog electronic amplifier based on the sensor output signal and one or more characteristics of a set of sensor measurement data, wherein the control system is further configured to control a gain value of the analog electronic amplifier according to the gain signal profile to suppress the signal fluctuation in the sensor output signal and to control the actuator based on an output of the analog electronic amplifier.

13. The legged robot of claim 12, wherein the control system is further configured to reduce the gain value of the analog electronic amplifier from a nominal gain value to a reduced gain value over a period of time indicated by the gain signal profile.

14. The legged robot of claim 13, wherein the control system is further configured to increase the gain value of the analog electronic amplifier from the reduced gain value to the nominal gain value based on detecting an attenuation of the signal fluctuation.

15. The legged robot of claim 12, wherein the control system is further configured to determine the gain signal profile based on a gait of the legged robot.

16. The legged robot of claim 12, wherein the control system is further configured to select the gain signal profile from two or more gain signal profiles, wherein a first gain signal profile of the two or more gain signal profiles is associated with an exponential change in the gain value over time, and wherein a second gain signal profile of the two or more gain signal profiles is associated with a linear change in the gain value over time.

17. The legged robot of claim 12, wherein the control system is further configured to determine the gain signal profile based on detecting an attenuation of the signal fluctuation.

18. The legged robot of claim 12, wherein the sensor is an inertial sensor.

19. The legged robot of claim 12, wherein the actuator is configured to control the foot.

20. The legged robot of claim 12, wherein the analog electronic amplifier is configured to adjust a power of the sensor output signal, wherein an amount of adjustment of the power is based on one or more parameters including the gain value of the analog electronic amplifier.

21. The legged robot of claim 12, wherein the control system is configured to determine the gain signal profile using machine learning.

22. The legged robot of claim 12, wherein the set of sensor measurement data comprises a set of previously-recorded measurements from one or more sensors.

* * * * *